US010807150B2

(12) United States Patent
Trinick

(10) Patent No.: US 10,807,150 B2
(45) Date of Patent: Oct. 20, 2020

(54) METHOD OF MANUFACTURING SELF-PIERCE RIVETS

(71) Applicant: Henrob Limited, Flintshire (GB)

(72) Inventor: Russell John Trinick, Flintshire (GB)

(73) Assignee: Atlas Copco IAS UK Limited, Flintshire (GB)

(*) Notice: Subject to any disclaimer, the term of this patent is extended or adjusted under 35 U.S.C. 154(b) by 125 days.

(21) Appl. No.: 15/573,412

(22) PCT Filed: May 13, 2016

(86) PCT No.: PCT/GB2016/051397
§ 371 (c)(1),
(2) Date: Nov. 10, 2017

(87) PCT Pub. No.: WO2016/181169
PCT Pub. Date: Nov. 17, 2016

(65) Prior Publication Data
US 2018/0117666 A1 May 3, 2018

(30) Foreign Application Priority Data

May 14, 2015 (GB) .................................. 1508297.7

(51) Int. Cl.
*B21K 1/60* (2006.01)
*F16B 5/04* (2006.01)
(Continued)

(52) U.S. Cl.
CPC .............. *B21K 1/60* (2013.01); *B21J 15/025* (2013.01); *B21K 1/58* (2013.01); *B23P 15/00* (2013.01);
(Continued)

(58) Field of Classification Search
CPC . B21K 1/60; B21K 1/58; B21J 15/025; F16B 19/086; F16B 5/04; B23P 15/00; B23P 2700/50; B23P 2700/01
See application file for complete search history.

(56) References Cited

U.S. PATENT DOCUMENTS 5,957,777 A 9/1999 Singh et al.
10,208,781 B2 * 2/2019 Campbell ............... F16B 19/08

FOREIGN PATENT DOCUMENTS

CN 102483084 A 5/2012
DE 1163281 B 2/1964
(Continued)

OTHER PUBLICATIONS

Office Action issued from the Chinese Patent Office for related Application No. 201680035873.3 dated Dec. 28, 2018 (11 pages including English Translation Summary).
(Continued)

*Primary Examiner* — John C Hong
(74) *Attorney, Agent, or Firm* — Michael Best & Friedrich LLP

(57) ABSTRACT

A method of manufacturing self-pierce rivets from a length of wire comprises separating the length of wire to form a plurality of slugs, each slug defining a head end and a tail end. The method further comprises forging a plurality of rivets from the slugs, each rivet having a head formed from the head end of a slug and a tip formed from the tail end of that slug, the head and the tip of the rivet being separated by a shank which defines a longitudinal axis, the rivet having a bore which runs substantially longitudinally through the tip and at least part way along the shank. For each of the plurality of rivets, the method comprises performing a machining operation on the tip the rivet or on the tail end of the slug from which the rivet was forged.

24 Claims, 14 Drawing Sheets

(51) Int. Cl.
  *F16B 19/08*    (2006.01)
  *B23P 15/00*    (2006.01)
  *B21J 15/02*    (2006.01)
  *B21K 1/58*     (2006.01)

(52) U.S. Cl.
  CPC .............. *F16B 5/04* (2013.01); *F16B 19/086* (2013.01); *B23P 2700/01* (2013.01); *B23P 2700/50* (2013.01)

(56) References Cited

FOREIGN PATENT DOCUMENTS

| DE | 20319610 U1   | 3/2004  |
|----|---------------|---------|
| DE | 102007046788 B3 | 1/2009 |
| EP | 0888837 A2    | 1/1999  |
| GB | 786300 A      | 11/1957 |
| JP | 2007254774 A  | 10/2007 |
| JP | 2009142889 A  | 7/2009  |
| JP | 2010179404 A  | 8/2010  |
| JP | 5055104 B2    | 10/2012 |
| JP | 2013502550 A  | 1/2013  |
| WO | 0118409 A1    | 3/2001  |
| WO | 2011023616 A1 | 3/2011  |

OTHER PUBLICATIONS

International Search Report and Written Opinion for Application No. PCT/GB2016/051397 dated Aug. 11, 2016, (12 pages).
English Translation of Decision of Rejection issued from the Korean Patent Office for related Application No. 10-2017-7036096 dated Aug. 23, 2019 (3 Pages).
Office Action issued from the Japan Patent Office for related Application No. 2017-559078 dated Dec. 24, 2019 (7 Pages including English language summary).

* cited by examiner

METHOD OF MANUFACTURING SELF-PIERCE RIVETS

RELATED APPLICATION DATA

This patent application is a national stage filing under 35 U.S.C. 371 of International Application No. PCT/GB2016/051397 filed May 13, 2016, which claims priority to Great Britain Patent Application No. 1508297.7 filed May 14, 2015, the entire contents of all of which are herein incorporated by reference.

SUMMARY

The present invention relates to a method of manufacturing self-pierce rivets which are of particular, but not exclusive, application to the automotive industry.

Self-piercing riveting (SPR) is a spot-joining technique in which a self-pierce rivet is driven by a punch into a workpiece supported on a die. The die is shaped so that as the rivet is driven into the workpiece towards the die, the material of the workpiece plastically deforms. This flow of workpiece material causes the annular tip of the rivet to flare outwards and remain encapsulated by an upset annulus of the workpiece material. The flared tip of the rivet interlocking with the upset annulus of the workpiece prevents removal of the rivet or separation of layers of the workpiece.

Self-pierce rivets are conventionally made by breaking 'slugs' of the appropriate length off a length of wire, before forging each slug into rivet. However, when the length of wire is fractured to separate it into slugs, macroscopic cracks or other defects can be created. The forging process may compress these defects but does not reliably remove them, therefore some defects may remain and introduce a point of weakness in the rivet. This may lead to failure of a joint produced using the rivet, for instance due to the rivet tearing during insertion into the workpiece or due to fatigue causing crack propagation. In addition, fracturing slugs from the length of wire can lead to an end of the slug having an oblique surface. This can lead to the rivet produced from that slug being slightly irregular about its circumference, meaning that its tip shape may vary about its circumference. The tip shape of a rivet is important for controlling the extent to which (and the uniformity with which) the rivet flares, therefore a rivet having a circumferentially irregular tip may not flare correctly when inserted into a workpiece.

It is an object of the present invention to mitigate or obviate at least one of the aforesaid disadvantages, and/or to provide an improved or alternative method of manufacturing self-pierce rivets.

According to a first aspect of the present invention there is provided a method of manufacturing self-pierce rivets from a length of wire, the method comprising:

separating the length of wire to form a plurality of slugs, each slug defining a head end and a tail end; and forging a plurality of rivets from the slugs, each rivet having a head formed from the head end of a slug and a tip formed from the tail end of that slug, the head and the tip of the rivet being separated by a shank which defines a longitudinal axis, the rivet having a bore which runs substantially longitudinally through the tip and at least part way along the shank;

wherein for each of the plurality of rivets the method comprises performing a machining operation on the tip the rivet or on the tail end of the slug from which the rivet was forged.

Performing the machining operation may remove defects from the tip of the rivet, or from the tail end of the slug before that slug is made into a rivet, thereby preventing those defects from causing failure or weakness in a joint produced using that rivet. Instead or as well, performing the machining operation may improve the geometric consistency of the slug tail end or the rivet tip about its circumference, thereby reducing the chance of a rivet flaring unevenly.

The method may include separating the length of wire into slugs before any slugs are forged into rivets. Alternatively, the method may include forging one or more slugs into rivets before all the slugs have been separated from the length of wire. For instance, the method may include separating a single slug (a first slug) from the wire, forging that slug into a rivet, and then separating another slug (a second slug) from the wire. Similarly, the machining operation may be performed on a rivet/slug before or after all the slugs have been separated from the length of wire and/or forged into rivets.

It is to be understood that the plurality of slugs may or may not comprise all of the slugs produced from the length of wire. Other slugs outside that plurality may also be produced, and/or some wire may be left over. Similarly, the plurality of rivets may or may not comprise all of the rivets produced from the wire, or all of the rivets produced from the plurality of slugs. For instance, a length of wire may be separated into 20 slugs and 18 of these may be forged into rivets, before machining operations are performed on the tips of 15 of these rivets. In this example, the plurality of rivets could be those 15 rivets, and the plurality of slugs could be the 15 slugs which were forged into the 15 rivets upon which machining operations were performed, the 18 slugs which were forged into rivets, or all 20 slugs. For completeness, the plurality of rivets could be (for example) 10 of the 15 rivets upon which machining operations were performed, and/or the plurality of slugs could be 19 of the 20 slugs produced from the wire, including only 14 of the 15 slugs which were made into rivets upon which the machining operations were performed.

The bore may run all the way through the rivet, may run through the entire shank and terminate at or within the head, or may terminate part way along the shank.

In some embodiments more than one slug is forged into a rivet at the same time, and/or more than one slug is separated from the length of wire at the same time.

For the avoidance of doubt, it is to be understood that reference to a slug or a rivet is intended to include a slug or rivet before or after the machining operation is performed. For instance, where the machining operation is performed on a rivet, the term 'rivet' may be used to refer to the rivet before the machining operation is performed, and/or the rivet after the machining operation has been performed.

A machining operation may be considered to be a manufacturing operation which removes material from an object (i.e. a slug or a rivet in this case).

Machining operations generally utilise movement in two different directions—a speed direction and a feed direction. The speed direction refers to the movement of the tool relative to the object being machined in the direction which leads to the removal of material from that object. For instance, in a turning operation (e.g. using a lathe) the speed direction is rotation of the object about its axis by the chuck, relative to the tool. In a milling operation the speed direction is rotation of the milling cutter about its axis.

The feed direction refers to the movement of the tool relative to the object being machined in the direction which determines the geometry of that object. For instance, in a turning operation the feed direction may be along the axis of the object (e.g. when 'turning down' the diameter of the object) or perpendicular to the axis of the object (e.g. when 'parting off' the object). As another example, in a milling operation the feed direction may be the direction of movement of the table on which the object is mounted.

Where the machining operation is performed on a slug, that slug may still be part of the length of wire, or may already be separate from the length of wire.

The method may further comprise performing a machining operation on the head end of the slug or the head of the rivet. In one example, a single machining operation is performed on both the head end of one slug and the tail end of another slug. In another example a machining operation is performed on the head end of a slug, that slug is then forged into a rivet, and then another machining operation is performed on the tip of that rivet. Where machining operations are performed on the head ends of the slugs or the heads of the rivets, those machining operation may or may not be substantially the same as the machining operations which are performed on the tail ends of the slugs or the tips of the rivets.

In some embodiments, each machining operation is performed on more than one rivet/slug simultaneously.

Reference to performing 'a' machining operation on a rivet or slug is not intended to imply that only a single machining step is performed in total. For instance, a rivet may undergo a polishing operation after the machining operation of the present invention is performed. Further, the machining operation of the present invention may comprise one or more machining steps. For instance, the machining operation may comprise multiple passes of a tool (or of different tools, any one of which may be considered to be 'the tool' as referred to herein).

The machining operation may or may not vary from rivet to rivet or slug to slug. In some embodiments of the invention, the machining operation is performed on some slugs, and on some rivets (e.g. the rivets made from slugs which did not undergo the machining operation). That embodiment may be considered to be both an embodiment where the machining operations are performed on the slugs, and an embodiment where the machining operations are performed on the rivets.

The rivets may be formed in a cold forging process, a hot forging process or a warm forging process.

The machining operations may be performed on the slugs, and each machining operation may also separate a slug from the length of wire.

Performing the machining operations on the slugs may allow the machining operations to be simpler (for instance producing a flat surface, rather than a more complex shape which may be required at the tip of a rivet). Instead or as well, performing the machining operation on the slugs may allow the invention to be implemented using existing forging equipment. In contrast, if the machining operations were performed on the rivets then the forging dies may have to be replaced (so that the rivets produced by the dies were still of sufficient length once some material was removed from their tips during the machining operation).

Each machining operation also separating a slug from the length of wire may reduce the total number of operations required to produce rivets from a length of wire, thereby increasing the speed and/or reducing the cost of rivet production.

Each machining operation may separate, from the length of wire, the slug with the tail end on which that machining operation was performed. Alternatively, each machining operation may be performed on the tail end of one slug, but separate a different slug from the length of wire.

The machining operation may be performed on each slug once that slug has been separated from the length of wire.

The machining operations may be performed on the rivets. This may be advantageous in that any defects produced during the forging process itself (for instance when the rivets are pushed from an extrusion pin) may be removed or reduced in size.

The machining operation performed on each rivet may form at least the part of the tip which is adjacent to the outer periphery of the shank. This may allow the machining operation to make more uniform a portion of the rivet tip which has a particularly large effect on the extent of flaring during rivet insertion.

Said part of the tip may be a discrete surface of the tip, a part of a discrete surface of the tip, or a part of a tip formed from one continuous surface.

The machining operation performed on each rivet may form at least the part of the tip which is adjacent to the bore. This may allow the machining operation to increase the uniformity of a portion of the rivet tip which has a particularly large effect on the extent of flaring during rivet insertion.

Said part of the tip may be a discrete surface of the tip, a part of a discrete surface of the tip, or a part of a tip which is formed from one continuous surface.

The machining operation performed on each rivet may form substantially the entire tip. This may ensure that circumferential irregularity of the tip is minimised in all regions thereof.

The machining operation may remove material along substantially all of the length of the bore of the rivet. The machining operation may remove material along the entire length of the rivet (e.g. for a rivet which has a through-bore).

The machining operation may be performed using a saw. The saw may be any suitable type of saw, such as a band saw, a reciprocating saw or a circular saw.

The machining operation may be performed using a grinding tool. The grinding tool may be of any suitable form, for instance a grinding wheel, a grinding plug, a honing tool, a lapping plate or a grinding belt. The grinding tool may be a dressable tool or a non-dressable tool.

The machining operation may be performed using a bladed tool. A bladed tool may be considered to be a tool with one or more cutting edges (as opposed to grains of abrasive, for example). For instance, it may be a turning tool such as a parting off tool, or a milling cutter.

For the avoidance of doubt, a saw which has an array of blades rather than pointed teeth may constitute both a saw and a bladed tool.

The grinding tool or bladed tool may be a formed tool. A formed tool may be considered to be a tool that is shaped in order to impart a specific profile to an object being machined, rather than a simple-geometry tool where it is the motion or position of the tool that defines the profile imparted. The formed tool may be of any suitable type, for instance a profiled grinding wheel or milling cutter.

Use of a formed tool may allow a particular shape to be imparted to each slug/rivet without the need for the tool to move along a complex path (which may require a more complex and expensive machine to be utilised for the machining operation).

The grinding tool or bladed tool may be a simple-geometry tool. Use of a simple-geometry tool may allow the machining operation to be performed using a tool of advantageously low cost.

Optionally:
- before separation of the length of wire to form the slugs, the length of wire defines a longitudinal axis;
- after each slug is separated from the length of wire, that slug defines a longitudinal axis which is substantially aligned with the portion of the longitudinal axis of the wire which ran therethrough; and
- after each rivet is forged from a slug, the longitudinal axis of the rivet is substantially aligned with the longitudinal axis of the slug from which it was made.

Alternatively, separating the slugs from the wire may involve alteration of the position of the slugs' longitudinal axes, and/or the forging process may change the orientation of the longitudinal axis of the slug when producing the rivet.

The machining operation may form a substantially planar surface on the tail end the slug, that surface being positioned substantially perpendicular to the longitudinal axis of the slug.

The tail end of the slug having such a surface may improve the circumferential continuity of the tip of a rivet forged therefrom, in comparison with a rivet forged from a slug with an oblique surface at its tail end.

Each machining operation may be performed while the slug or rivet, and the tool used to perform the machining operation, are rotated relative to one another about the longitudinal axis of the slug or rivet.

The machining operation may remove material to a depth of at least 0.2 mm.

The method may further comprise a heat treating step, a plating step and/or a lubrication step. Such steps may be performed at any stage in the method, for instance before separation of the wire into slugs or after both the machining operation and the forging process have been completed.

According to a second aspect of the present invention there is provided a self-pierce rivet manufactured using a method according to the first aspect of the invention.

A rivet according to the second aspect of the invention may have fewer defects at its tip, and/or have a tip of more circumferentially uniform shape, for the reasons discussed above.

According to a third aspect of the present invention there is provided a method of manufacturing a product, the method comprising manufacturing self-pierce rivets using a method according to the first aspect of the invention, and driving one of the rivets into a workpiece using a punch such that the rivet flares into the workpiece without fully penetrating the workpiece.

A method according to the third aspect of the invention may produce a product with joints of improved quality due to the reduction of defects and/or the improved tip uniformity discussed above.

According to a fourth aspect of the invention these is provided a product manufactured using a method according to the third aspect of the invention.

The product may be a vehicle such as a car or an aeroplane.

BRIEF DESCRIPTION OF THE DRAWINGS

Specific embodiments of the present invention will now be described, by way of example only, with reference to the accompanying drawings in which.

Throughout the figures, corresponding reference numerals denote the same or corresponding features.

DETAILED DESCRIPTION

Figure 1:
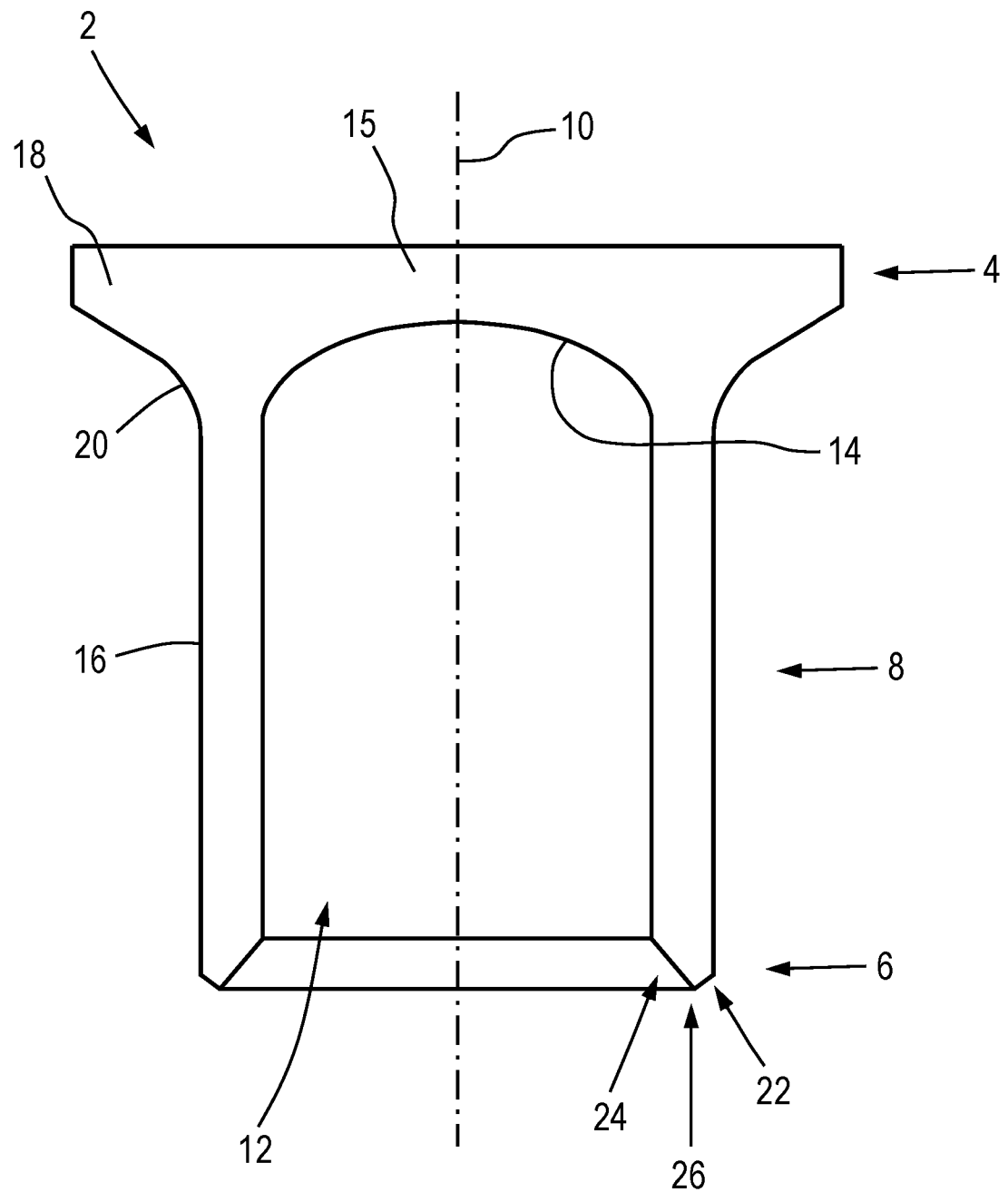
FIG. 1 is a cross-sectional side view of an exemplary self-pierce rivet.

A cross section of an exemplary self-pierce rivet is shown in FIG. 1. The rivet 2 has a head 4 and a tip 6 spaced apart by a shank 8. The shank 8 defines a longitudinal axis 10 of the rivet. The rivet also has a bore 12 which runs substantially along the longitudinal axis 10, through the tip 6 and the shank 8, and terminates at the head 4. In this case, the bore is substantially circular in cross section and terminates in a domed end wall 14. The region 15 beyond the end of the bore 12 of a rivet is conventionally referred to as the 'web'. Since the bore 12 in this example terminates within the rivet, the bore may be referred to as a blind bore. Rivets with a blind bore are sometimes known as semi-hollow or semi-tubular rivets. In other rivets, the bore may have any other suitable shape. For instance, it may be oval or octagonal in cross section. Furthermore, whilst in this example the bore 12 is of substantially uniform shape, in other cases its shape may change along its length. For instance, the bore may be tapered (for example it may narrow towards the head 4, narrow towards the tip 6, or have a narrowed waist portion and get wider towards both the tip and the head).

In this example, the shank 8 of the rivet 4 is substantially circular in longitudinal cross-section, defining an outer periphery in the form of a substantially cylindrical surface 16. In other examples, the shank and/or head may take any other suitable form. For instance, the shank may be hexagonal, octagonal or oval in cross section, and may or may not change in shape or diameter along its length.

The head 4 of the rivet 2 of this example takes the form of a generally radially-extending flange 18 which intersects the outer periphery 16 of the shank 8 at a fillet 20. The head 4 in this case is of the same general shape as the head of a countersunk screw. In other examples the head of a rivet may have the general shape as that of a cheese head, pan head or domed head screw, or may have any other suitable shape. It may or may not be circular in cross section. In one example, the rivet head is indistinguishable from the tail before insertion into a workpiece. In such an example, during or after insertion of the rivet, the head of the rivet is deformed to form an outwardly-projecting flange which overlies the top surface of a workpiece.

The tip 6 of the rivet 2 of this example has a portion 22 which is positioned adjacent to the outer periphery 16 of the shank 8 (referred to below as the 'outer portion'), and a portion 24 which is adjacent to the bore 12 (referred to below as the 'inner portion'). In this case, the inner portion 24 and outer portion 22 are both substantially frusto-conical in shape, and cooperatively define a substantially annular cutting edge 26 therebetween.

Figure 2:
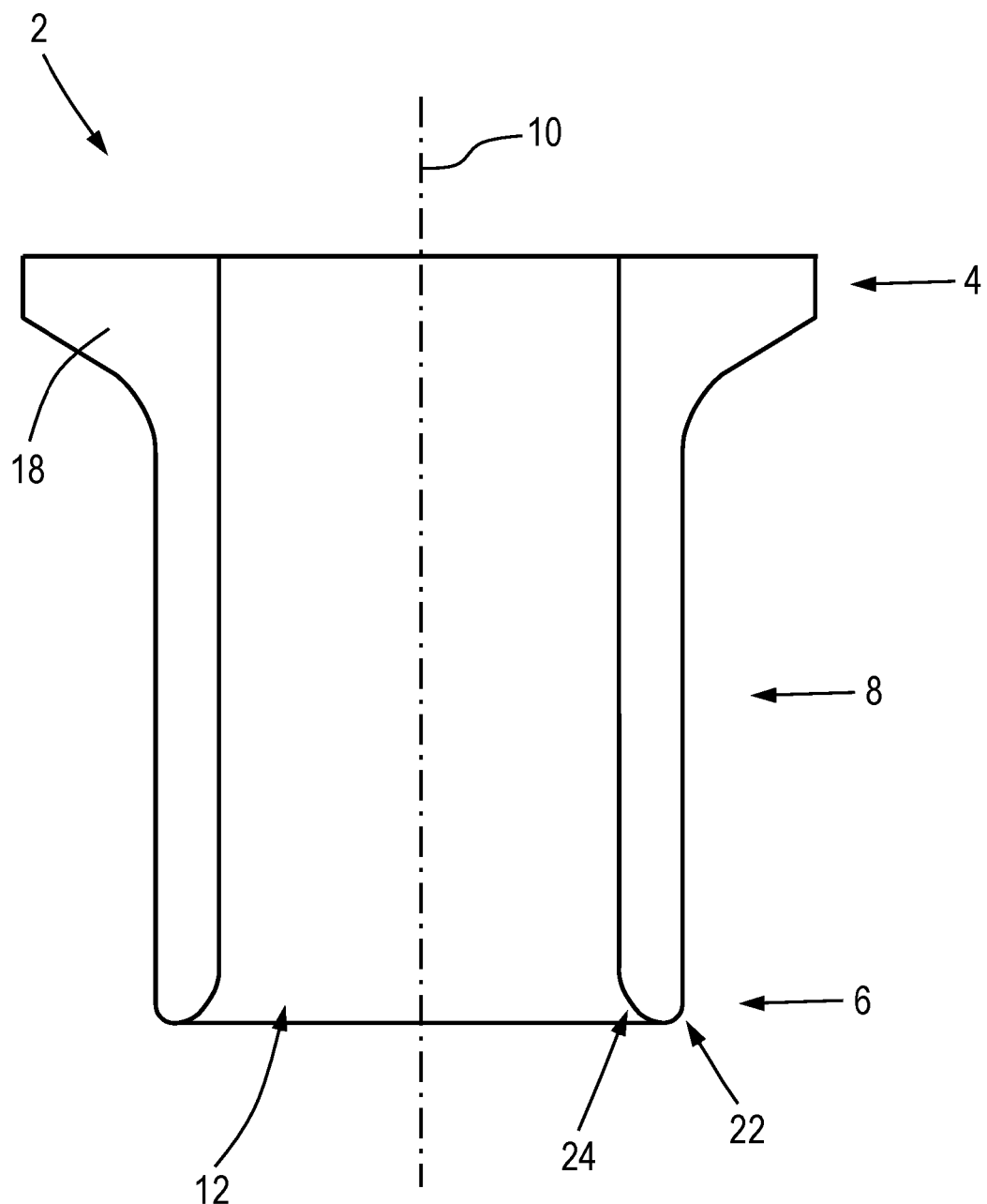
FIG. 2 is a cross-sectional side view of another exemplary self-pierce rivet.

Another example of a self-pierce rivet is shown in FIG. 2. Like the rivet 2 of FIG. 1, the rivet 2 of FIG. 2 has a head 4 in the form of a generally radially extending flange 18, a shank 8 which is circular in cross-section, a tip 6 and bore 12. However, in this example the bore 12 does not terminate at the head 4 but passes all the way through the rivet 2. Accordingly, the rivet 2 of FIG. 2 does not have a web. The bore 12 therefore takes the form a through-bore. Rivets with a through-bore are sometimes known as tubular or hollow rivets.

The rivet 2 of FIG. 2 also differs from that of FIG. 1 in that the outer portion 22 and inner portion 24 are arcuate in cross section, rather than being frusto-conical (i.e. flat in cross section). In addition, the inner and outer portions 24, 22 of the tip 6 cooperatively form a continuous arcuate surface. Accordingly, they do not define a cutting edge.

To produce a joint using a self-piercing rivet, the rivet is driven by a punch into a workpiece that is supported on a die. The workpiece generally comprises two or more layers of material. As the rivet is inserted by the punch, the rivet pierces the workpiece and causes workpiece material to be plastically deformed. The die directs the plastic flow of workpiece material, and in some cases provides a cavity into which workpiece material can be displaced by the rivet. Due to the shape of the rivet's tip and/or due to the plastic flow of workpiece material, as the rivet is inserted its shank flares outwards. The geometry and material of the rivet and the shape of the die are selected so that for a particular workpiece (i.e. for a particular combination of sheets of particular materials and thicknesses), when the rivet has been fully inserted into the workpiece its tip does not fully penetrate the bottom layer of the workpiece. This allows the bottom workpiece layer to provide an air-tight seal, for instance so as to prevent moisture ingress. The rivet and die are also selected so that the shank of the rivet flares sufficiently to provide an acceptable degree of interlock (discussed below) with the bottom layer, but does not flare prematurely and/or crumple.

Figure 3:
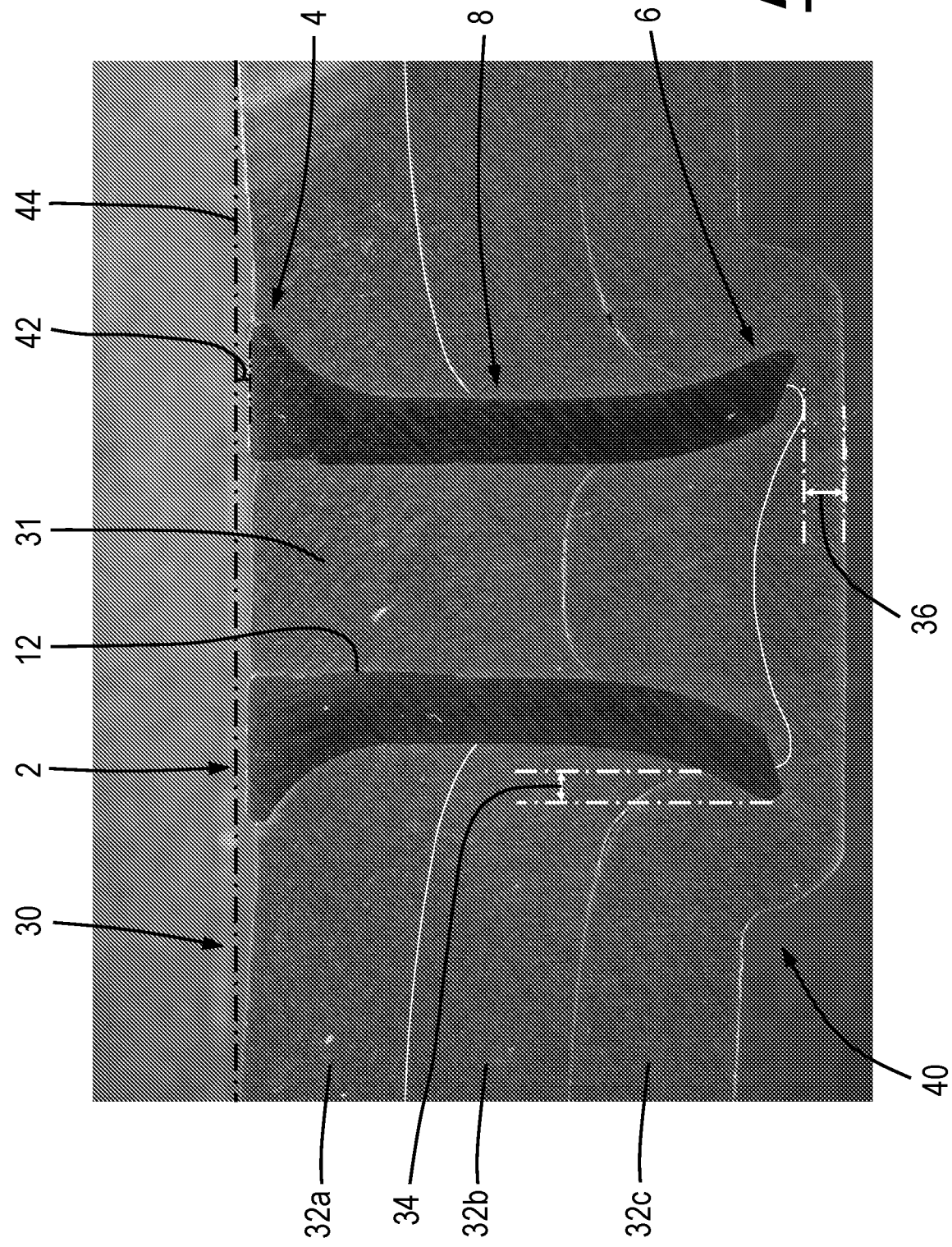
FIG. 3 is a cross-sectional side view of a self-pierce riveted joint.

FIG. 3 shows an example of a self-pierce riveted joint. The rivet 2 used in this joint was generally similar to the rivet shown in FIG. 2 in that it was tubular, however the rivet 2 of the joint of FIG. 3 has a tip 6 which more closely resembles that of the rivet of FIG. 1.

The joint of FIG. 3 was produced by inserting a self-pierce rivet 2 into a workpiece 30. In this case, the workpiece is made up of three layers material—a top layer 32a, a middle layer 32b and a bottom layer 32c. For the avoidance of doubt, reference herein to the 'top' and 'bottom' layers of a workpiece refer to the layers which are pierced by the rivet 2 first and last respectively. The terms are not intended to imply any specific spatial orientation during (or after) riveting. Furthermore, self-pierce riveting may be used with workpieces comprising any suitable number of workpiece layers of any suitable thickness and material composition. In some circumstances self-pierce riveting may be performed on a workpiece comprising a single layer, for instance when inserting a self-pierce rivet with a threaded projection from its head so as to provide a mounting point on a sheet of material.

As shown in FIG. 2, as the rivet 2 was inserted into the workpiece 30, a workpiece slug 31 travelled up to the bore 12 of the rivet, and the shank 8 of the rivet flared outwards into the bottom layer 32c of the workpiece 30. The flaring of the shank 8 has provided an interlock 34 (also known as an undercut) with the bottom layer 32c. The interlock 34 retains the rivet 2 within the workpiece 30 and thereby prevents separation of the workpiece layers, 32a, 32b, 32c. The head 4 and the flared shank 8 hold the top and bottom layers 32a, 32c together, sandwiching any intermediate layers (in this case the middle layer 32b) therebetween. The interlock 34 may be considered to be the radial overlap (with respect to the longitudinal axis of the rivet 2) between the tip 6 of the rivet and the bottom layer 32c of the workpiece 30 (at the point around the circumference of the rivet at which this overlap is smallest).

As also shown in FIG. 3, the rivet 2 has not penetrated all the way through the bottom layer 32c of the workpiece 30. Rather, there remains a minimum thickness 36 of the bottom layer 32c. The minimum thickness 36 may be considered to be the axial thickness (with respect to the longitudinal axis of the rivet) of the bottom workpiece layer 32c at the point at which the layer above it (in this case the middle layer 32b) or the tip 6 of the rivet comes closest to fully penetrating it. In this case, it is the middle layer 32b, rather than the tip 6 of the rivet 2 which comes closest to penetrating the bottom layer 32c.

Also visible in FIG. 3 is a 'button' 40 formed by the rivet 2 displacing workpiece material into a cavity in the die (not visible). Also labelled on FIG. 3 is the head height 42 of the joint. Head height 42 may be considered to be the maximum distance between the top surface of the head 4 above or below a plane 44 defined by the top surface of the top sheet 32a. In this example, the head 4 is recessed below the plane 44, therefore the head height 42 is negative.

The interlock 34, minimum thickness 36 and/or head height 42 of a riveted joint is often used to assess its quality. Although the requirements of a joint vary considerably between different fields and applications, one example of a specification for an acceptable joint states that the interlock 34 must be at least 0.4 mm, that the minimum thickness must be at least 0.2 mm, and that the head height must be between +0.3 mm and −0.5 mm.

The shape of the tip of a rivet has a very significant effect on the extent to which the shank of that rivet flares when inserted into a workpiece. For example, referring back to FIG. 1, the inner portion 24 forming a greater proportion of the overall radial thickness of the tip 6 may lead to the rivet 2 tending to flare to a greater extent. On the other hand, the outer portion 22 of the tip forming a greater proportion of the radial thickness of the tip 6 may tend to lead to the rivet 2 flaring to a lesser extent. As another example, referring to FIG. 2, the inner portion 24 of the tip 6 having a larger radius of curvature may tend to increase the extent to which the rivet 2 flares, and the outer portion 22 having a larger radius of curvature may tend to lead to the rivet flaring less.

Figure 4A:
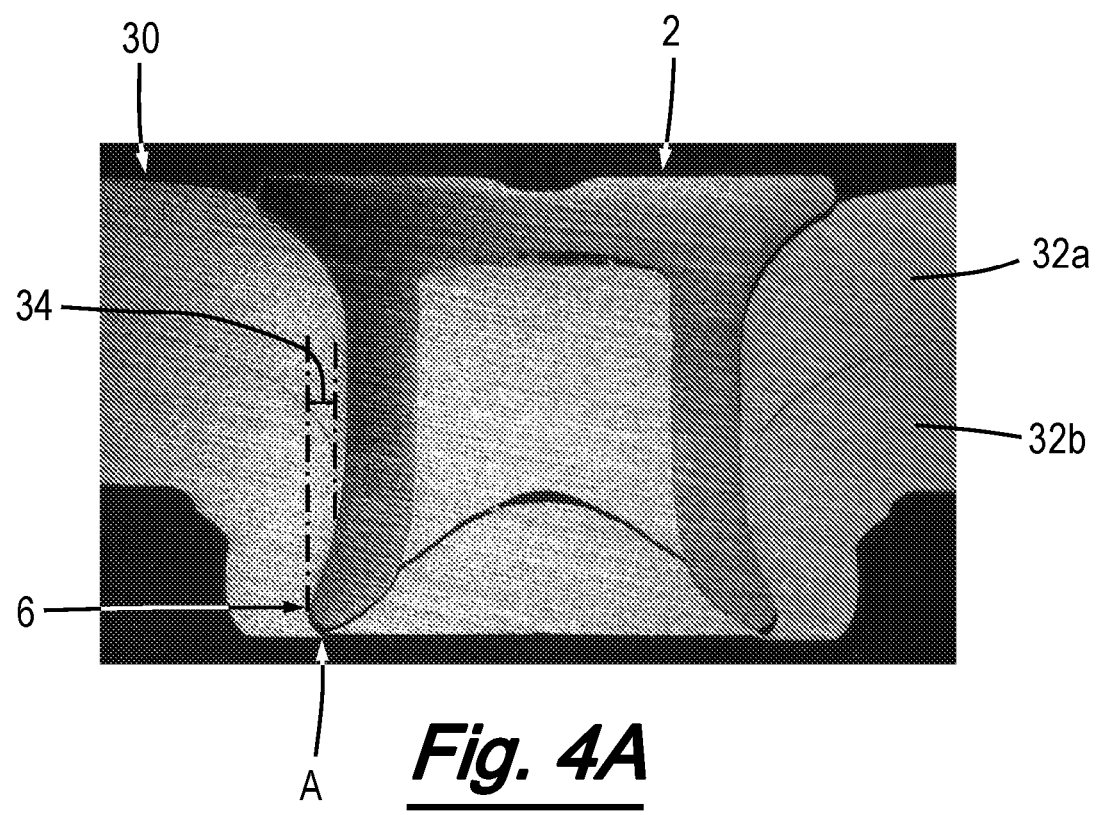
FIG. 4A is a cross-sectional side view of a self-pierce riveted joint exhibiting 'staking'.

The extent to which a rivet flares must often be carefully controlled so as to produce an acceptable joint. Returning to FIG. 3, if a rivet 2 flares too little then it can over-penetrate the bottom layer 32c of the workpiece 30, thereby reducing the minimum thickness 36 and reducing the interlock 34. This problem is communally known as 'staking'. An example of a joint where staking has taken place is shown in FIG. 4A. In this joint, the workpiece comprises two layers—a top layer 32a and a bottom layer 32c. In this example, the tip 6 of the rivet 2 has penetrated fully through the bottom layer 32c of the workpiece 30 in the region highlighted by arrow A. Accordingly, the integrity of the bottom layer 32c has been compromised and no longer provides a gas-tight seal. The interlock 34 is also smaller than is required for this specific joint.

Figure 4B:
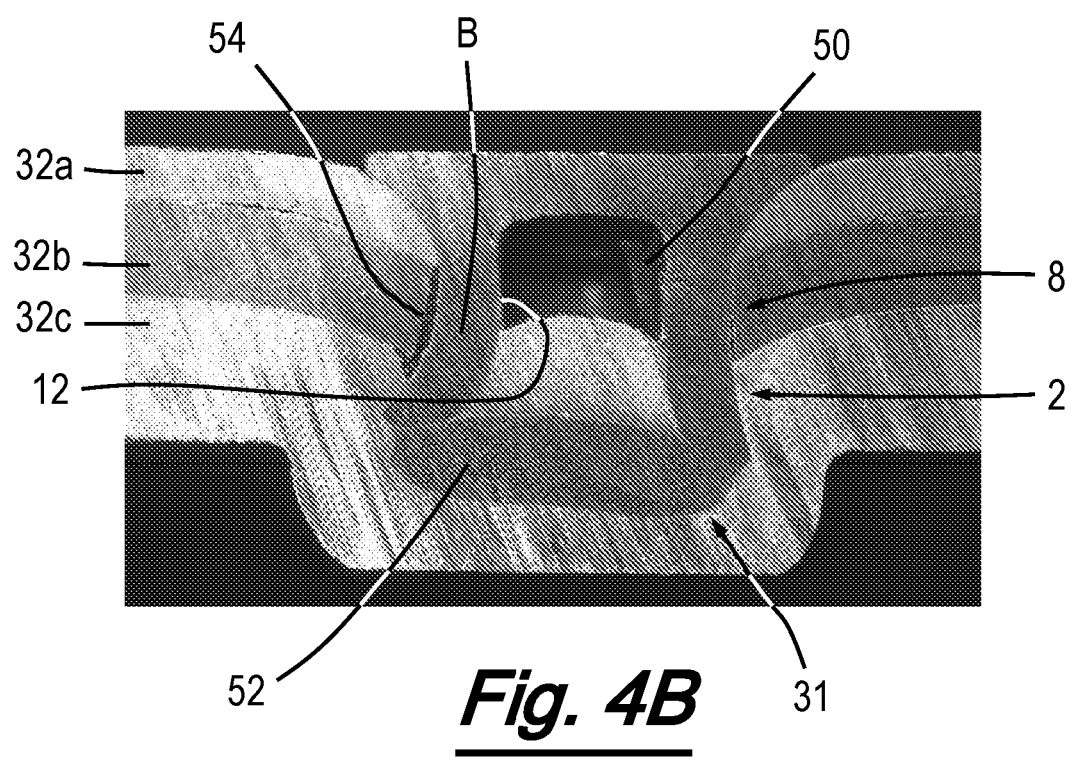
FIG. 4B is a cross-sectional side view of a self-pierce riveted joint exhibiting excessive or asymmetric flaring.

Excessive flaring of a rivet can also result in an unacceptable joint. One such joint is shown in FIG. 4B. In this case, as with the joint shown in FIG. 3, the workpiece 30 has three layers. In the joint of FIG. 4B, excessive and asymmetric flaring has caused the shank 8 of the rivet 2 to buckle inwards. This is particularly apparent in the left side of the shank (from the perspective of FIG. 4B), in the region labelled B. Such buckling can reduce the interlock provided by the rivet, and/or introduce a point of weakness (or even a crack or fracture) which may render the joint susceptible to immediate or premature failure. Although not particularly apparent in the joint of FIG. 4B, in some cases excessive flaring of the rivet 2 can reduce the minimum thickness of the bottom workpiece layer 32c due to the rivet pushing the workpiece slug 31 downwards rather than accommodating it in its bore 12. This can be seen to a degree in FIG. 4B—the workpiece slug 31 has only reached approximately half way up the bore 12, leaving a void 50 beyond it. As a result, the portion 52 of the workpiece slug 31 which originates from the layer above the bottom layer 32c (in this case the middle layer 32b), has been forced downwards (from the perspective of FIG. 4B) along with the rivet 2. In some circumstances, this portion 52 of the workpiece slug 31 can be forced fully through the bottom workpiece layer 32c. Another problem with excess rivet flaring is that buckling of the shank 8 can reduce the interlock provided by the rivet. This is visible to an extent in FIG. 4B, where the left hand side of the shank 8 has begun to pull away from the middle workpiece layer 32b, leaving a cavity 54. If this portion of the shank had moved inwards further, the interlock provided would be reduced dramatically.

Figure 5A:
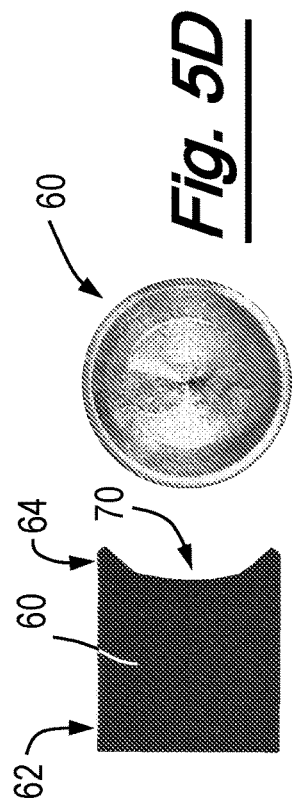
FIGS. 5A to 5F show stages in the production of a self-pierce rivet using a conventional method.

Self-pierce rivets are generally manufactured by separating a length of wire of the appropriate diameter into "slugs" before forging each slug into a rivet in one or more forging operations. FIGS. 5A to 5F show stages in the production of a rivet using a typical known method. The first step in the process is to separate a slug from a length of wire. Conventionally, this is done by shearing a portion of the wire of an appropriate length using a shearing blade to produce a slug 60, an example of which is shown in FIG. 5A. The slug 60 has a head end 62 which will be formed into the head of the rivet, and a tail end 64 which will be formed into the tip of the rivet. At this stage, however, the head end 62 and tail end 64 are substantially the same. Each end of the slug 60 has two regions—a first region 66 where the shearing blade penetrated into wire by displacing the material of the wire, and a second portion 68 in the form of a fracture surface produced when insertion of the shearing blade caused the slug 60 to snap off from the wire. This figure also shows that due to this fracturing of the slug 60 from the length of wire, the two end surfaces of the slug 62, 64 are slightly uneven and have a rough texture.

Figure 5B:
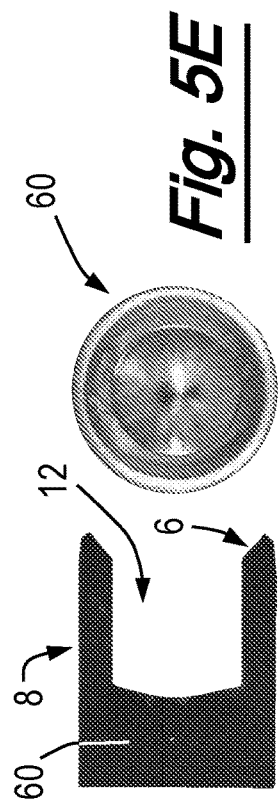
Figure 5C:
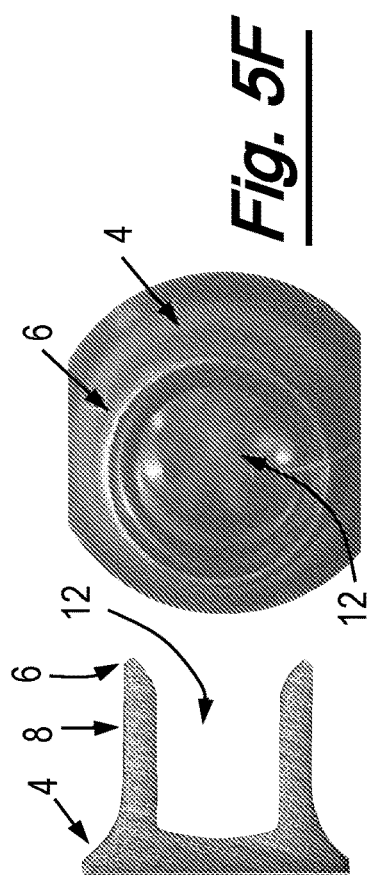
Figure 5D:
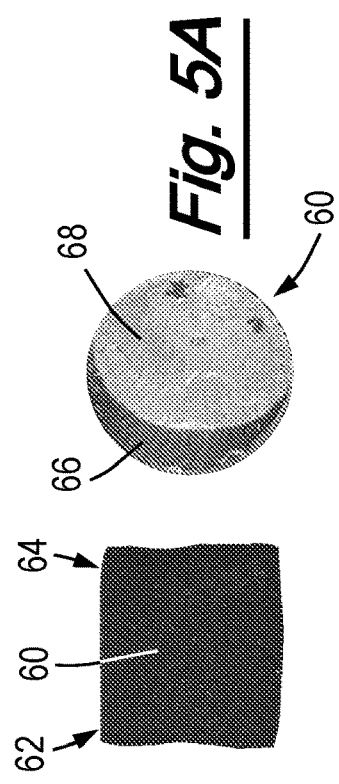

When the slug 60 has been separated from the length of wire, in this exemplary method a first forging operation is performed. This operation flattens the head end 62 of the slug 60 and introduces a slight concavity 70 to the tail end 64. This is shown in FIG. 5B. A further forging operation is then produced to increase the size of this concavity 70, as shown in FIG. 5C. Another forging operation is then performed on the slug 60 to change the shape of the concavity 70, thereby forming the approximate shape of what will become the tip of the rivet. This is shown in FIG. 5D.

Figure 5E:
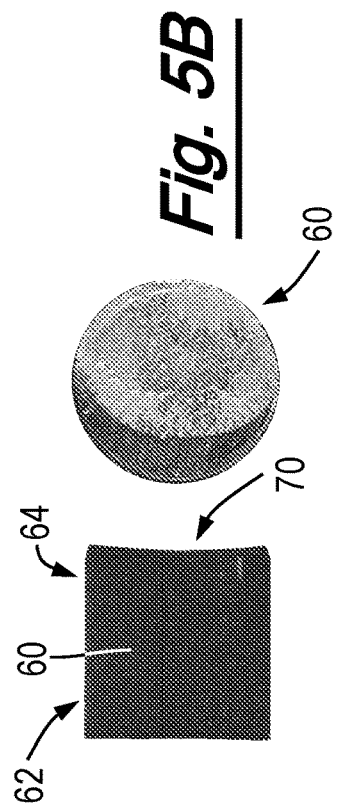

Further forging operations increase the depth of the concavity to produce the bore 12 of the rivet, to define the shank 8 of the rivet, and to refine the shape of its tip 6. This is shown in FIG. 5E. The bore 12 is conventionally produced using an extrusion pin which projects from a forging die (not shown). The extrusion pin is forced into the slug 60 to form the bore 12 (or widen and/or deepen it). After the bore 12 has been formed, the slug 6 usually sticks tightly over the extrusion pin. Generally, therefore, the extrusion pin is retractable or is provided with extendable ejection sleeve. To remove the pin from the slug 60, the pin is retracted so as to withdraw it from the bore 12, or the ejection sleeve is extended to force the slug out from over the extrusion pin.

Figure 5F:
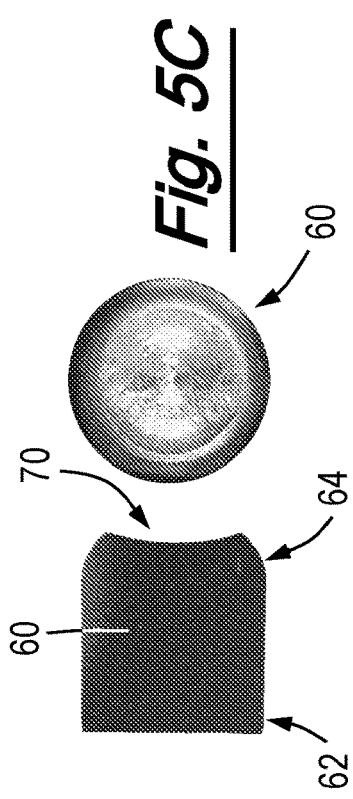

After forging of the tip 6, shank 8 and bore 12, a further series of forging operations is performed on the slug 60 so as to form the head 4. This completes the formation of the rivet 2, as shown in FIG. 5F.

Although in this particular example the tip and bore are fully formed before the head is produced, it is to be understood that in other methods any suitable number of forging operations may produce the features of the rivet in any suitable order. For instance, the general shape of the shank may be formed first, then the head may be fully formed, then the shank may be completed and the tip fully formed. As another example, the shank may be formed first and then the head and the tip may be formed simultaneously. In another example, all the features of the rivet may be formed simultaneously, either in a single operation or progressively through a series of operations.

Figure 6A:
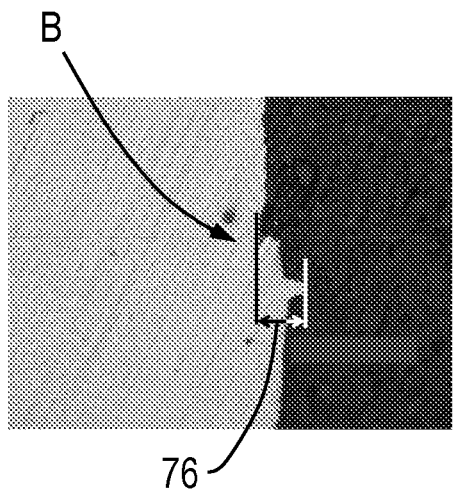
FIGS. 6A to 6C are cross-sectional views of defects in the surfaces of slugs.
Figure 6B:
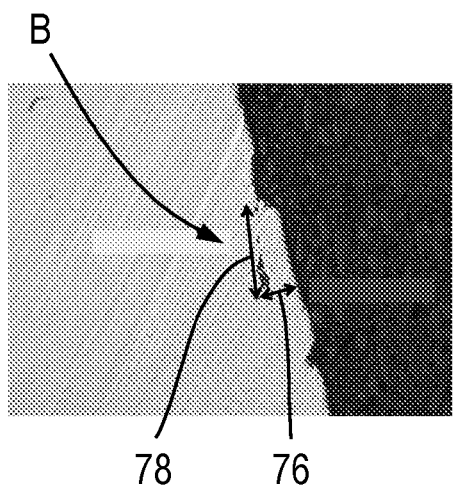
Figure 6C:
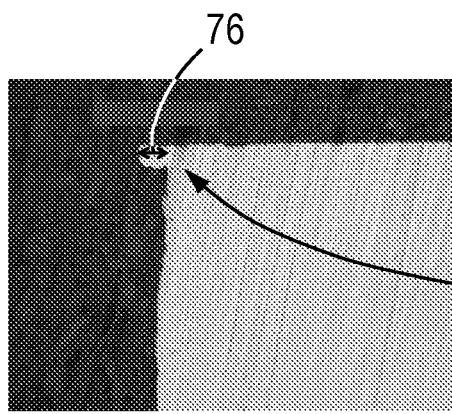

One problem with conventional rivet manufacture such as the method described above is that when slugs are fractured from the length of wire, macroscopic cracks or other defects can be formed, especially in the fracture surfaces 68. The forging process may flatten such defects but does not usually eliminate them. FIGS. 6A to 6C show examples of such defects (before forging), denoted B. The body of the rivet is shown on the left in FIGS. 6A and 6B, and to the bottom right in FIG. 6C. The depth 76 of each defect B is marked on the figures, as is the length of propagation 78 of the crack shown in FIG. 7B. As an indication of scale, the depths 76 of the defects of FIGS. 6A, 6B and 6C are 63 µm, 45 µm and 40 µm respectively. The length of propagation 78 of the crack of FIG. 6B is 116 µm.

Figure 7A:
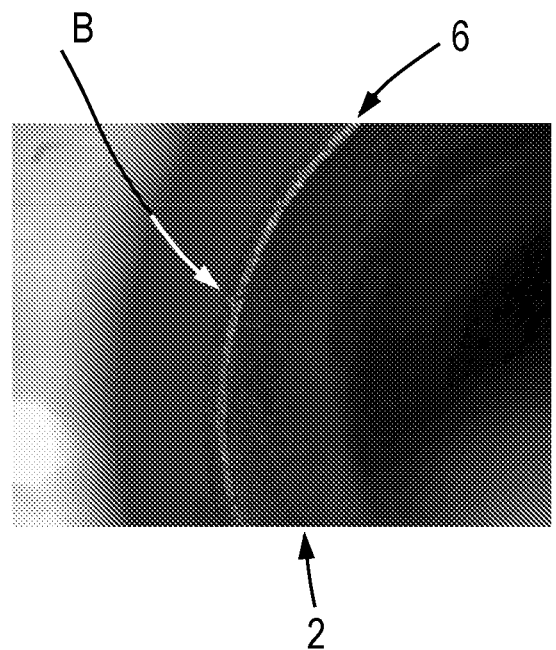
FIG. 7A is a close-up view of a rivet with a macroscopic crack in its tip.
Figure 7B:
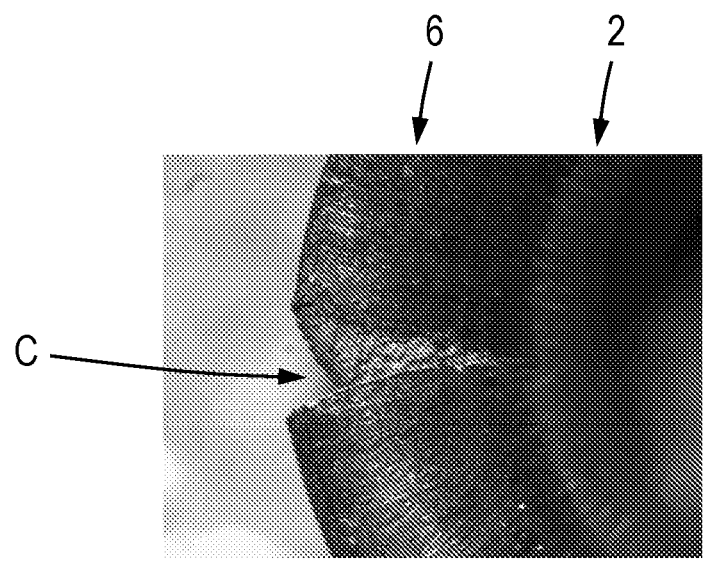
FIG. 7B is a close-up view of the rivet of FIG. 7A after experiencing deformation which simulates insertion into a workpiece.

Defects such as those shown in FIGS. 6A to 6C are often small enough to go unnoticed in a finished rivet, but when that rivet is subjected to the forces required to insert it into a workpiece, and the shank is flared outwards within a workpiece, such defects can lead to a reduction in the performance of the rivet or even a fracture. This is generally more of a problem when using rivets of relatively high hardness values. FIG. 7A shows a microscopic crack in the tip 6 of a rivet 2 after the forging process. FIG. 7B shows the same crack after the rivet has been deformed in a manner which mimics flaring within a workpiece. It can be seen that the crack B of FIG. 7B has led to a fracture C of the tip 6. A fracture such as this could have a very considerable effect on the performance of the joint produced.

Another problem with conventional rivet manufacturing methods is that the tip of the rivet can be uneven about its circumference. This can happen, for example, when the rivet is pushed from an extrusion pin during forging (for instance by an ejection sleeve, or by a surface of a forging die as the ejection pin is retracted). It can also be created where fracture of the slug from a length of wire creates an oblique surface (particularly at the tail end of the slug)—in some cases the presence of such an oblique surface is not completely corrected during the forging process, and leads to the tip of the rivet being uneven.

Figure 8A:
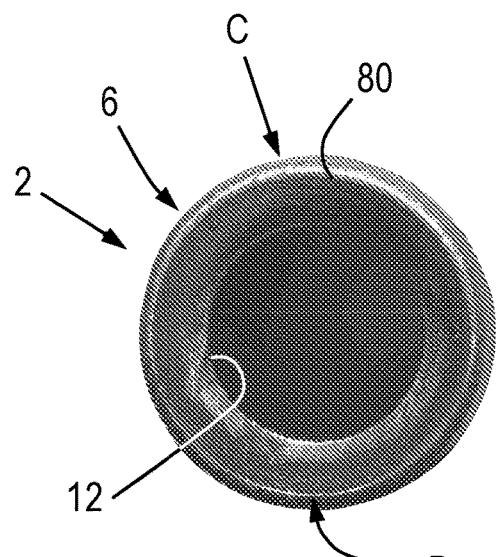
FIG. 8A is an end view of a rivet with an irregular tip.
Figure 8B:
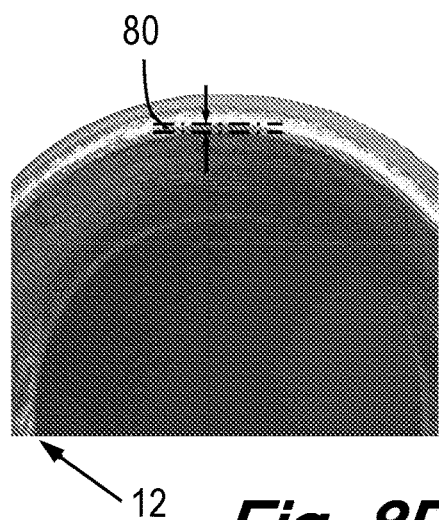
FIG. 8B is a close-up of part of the tip of the rivet of FIG. 8A.
Figure 8C:
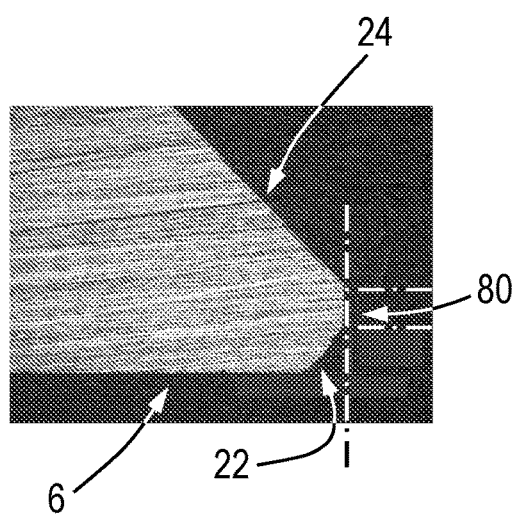
FIGS. 8C and 8D are cross-sectional views of regions of the tip of the rivet of FIGS. 8A and 8B.
Figure 8D:
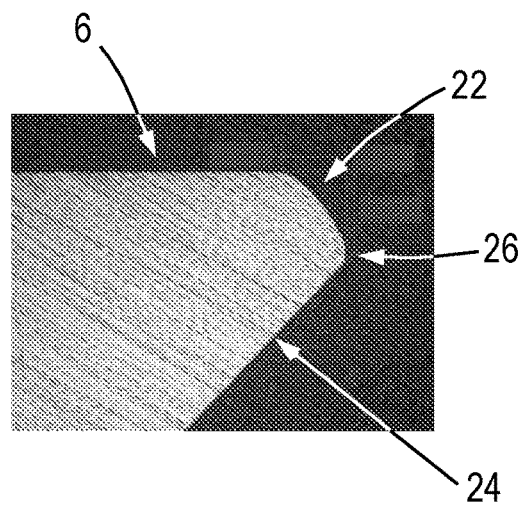

FIGS. 8A to 8D show a rivet 2 the tip 6 of which is irregular about its circumference. In this case, the tip has a flat surface 80 which extends around approximately 200° of its circumference. The flat surface 80 is shown enlarged in FIG. 8b. FIGS. 8C and 8D show cross-sections through the tip 6 of the rivet 2 at the points labelled C and D on FIG. 8A. The longitudinal axis (not visible) of the rivet is above the portion of the tip that is shown in FIG. 8C, and below the portion of the tip that is shown in FIG. 8D. At point C, the tip 6 has three portions—a portion 22 which is adjacent to the outer periphery of the shank, a portion 24 which is adjacent to the bore, and the flat surface 80 (described above) positioned therebetween. As an indication of scale, the radial width of the flat surface 80 (i.e. the height of the flat surface from the perspective of FIG. 8c) is 100 μm, the radial width of the outer portion 22 is 130 μm and the axial length of the outer portion 22 is 130 μm.

In contrast to point C, at point D the inner portion 24 and outer portion 22 of the tip define a cutting edge 26. At this point around the tip 6, the radial width of the outer portion 22 is 220 μm and the axial height of the outer portion 22 is 169 μm. It will be apparent from comparing FIGS. 8C and 8D that the radius of curvature of the outer portion 22 is considerably larger at point D than at point C.

As discussed above, the geometry of the tip of a rivet has a significant effect on the extent to which is flares. Accordingly, the rivet shown in FIGS. 8A to 8D may flare unevenly about its circumference due to its circumferentially irregular tip geometry, thereby reducing the quality of the joint produced. In some cases, uneven tip geometry can prevent a rivet from functioning correctly due to uneven flaring, even if all regions of the tip are within acceptable tolerances.

The applicant has recognised the above limitations of conventional rivet manufacturing methods after having performed extensive testing and analysis. Further analysis and experimentation has led the applicant to discover that by performing a machining operation on the tip of a rivet or on the tail end of a slug, the occurrence of cracks or defects, and/or the production of rivets with uneven tips, can be advantageously reduced.

Figure 9A:
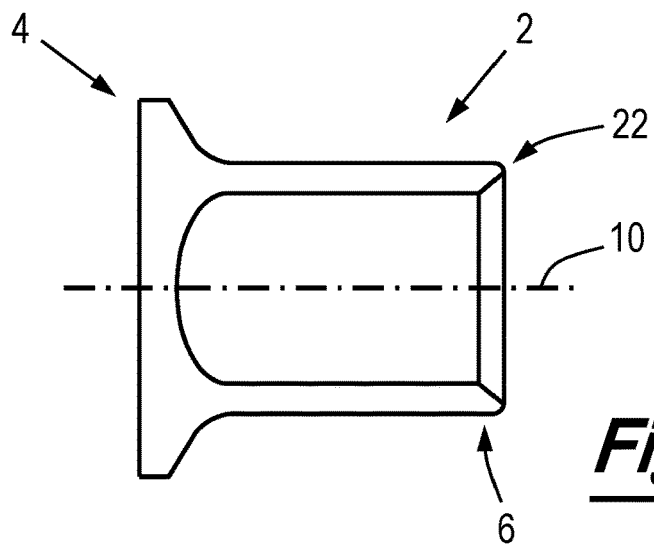
FIGS. 9A to 9C are schematic cross-sectional side views of stages in a method according to a first embodiment of the invention.
Figure 9B:
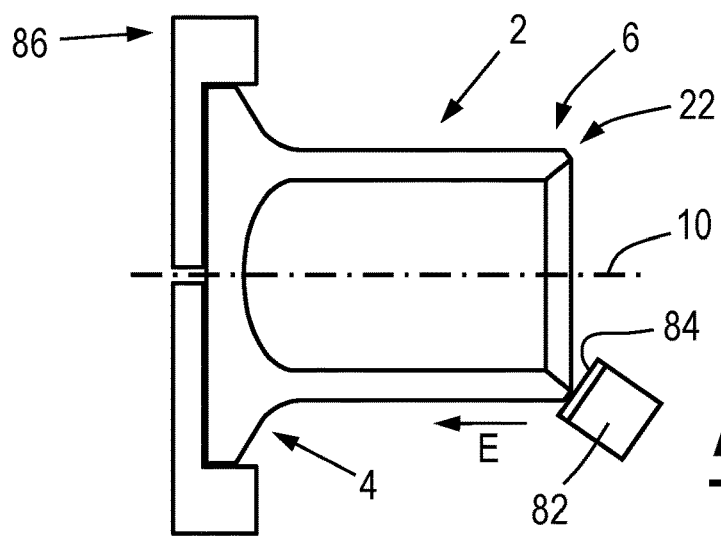
Figure 9C:
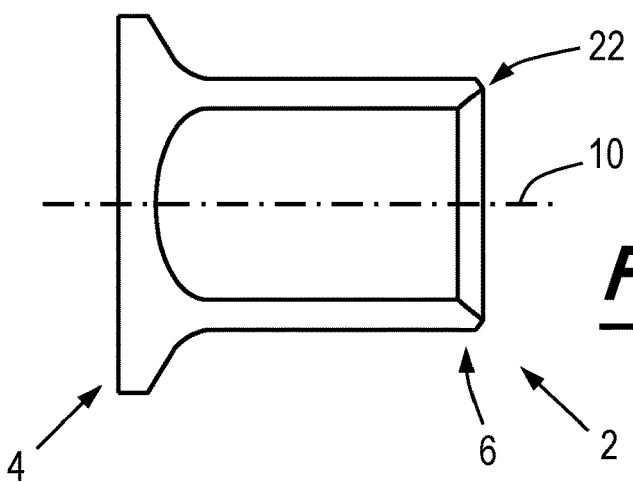

A method according to a first embodiment of the invention is illustrated in FIGS. 9A to 9C. The first stage of this method involves manufacturing a rivet 2 using a conventional method, where a length of wire is separated into slugs and each slug is forged into a rivet, such as the method described with reference to FIGS. 5A to 5F. An exemplary rivet produced by such a process is shown in FIG. 9A. In this example, the rivet 2 has an uneven tip 6, with the outer portion 22 of the upper side of the tip (from the perspective of FIG. 9A) being arcuate and the outer portion of the lower side of the tip being substantially flat. In this embodiment, the machining operation is performed on the tip 6 of the rivet 2. More particularly, the outer portion 22 of the tip 6 is turned down using a bladed tool 82. The rivet 2 produced by the forging process may therefore need to be slightly longer than the final dimensions required, so that material can be removed from the tip without making the rivet too short. In this case, the bladed tool 82 has a single straight cutting edge 84. It may therefore be considered to be a 'simple-geometry tool'.

As shown in FIG. 9B, to perform the machining operation in this embodiment the rivet 2 (more particularly the head 4 of the rivet, in this example) is mounted in a chuck 86. The chuck 86 rotates the rivet 2 about its longitudinal axis 10. This rotation of the rivet is an example of movement of the rivet relative to the tool 82 in a speed direction. The bladed tool 82 is then introduced to the rivet 2 by moving the tool in a feed direction (arrow E). In this case the feed direction E is substantially parallel to the longitudinal axis 10 of the rivet, however in other embodiments the feed direction may be any other suitable direction. For instance, in a modification of this embodiment the feed direction is substantially radially inward with respect to the longitudinal axis 10 of the rivet 2. In another modification, the feed direction is perpendicular to the cutting edge 84 of the tool 82.

When the tool 82 has moved sufficiently in the feed direction E for the outer portion 22 of the tip 6 of the rivet to be of the geometry required, the process is stopped and the rivet 2 is removed. As shown in FIG. 9C, after the machining process the shape of the rivet tip 6 has been made more uniform. In this embodiment the machining operation gives the tip 6 a completely uniform shape. In other cases, however, the machining operation may reduce the variation in shape of the tip 6 but may not make it completely regular.

Since the machining operation also removes material from the tip 6 of the rivet 2, defects in that material are also removed. Accordingly, the chance of any defects remaining at the rivet tip 6, and subsequently causing failure of a joint produced using the rivet 2, can be reduced.

After the rivet 2 has been given its final shape, it can then be sent for heat treating, plating and/or lubrication (as appropriate) in a conventional manner. Heat treating, plating and/or lubrication can be performed before the machining operation has been performed. However, it is preferable for the machining operation to be performed before plating or lubrication so that it does not remove lubricant or plating material, or introduce swarf which may be stuck to the rivet by lubricant. Temper the rivets to put into a consistent form this can assist the machining because the material will exhibit consistent mechanical properties. It is also often advantageous for the machining operation to be performed before heat treatment, since heat treatment of self-pierce rivets is usually used to harden them, and in most circumstances it is more efficient to machine a part in its softer state than once it has been hardened. In some circumstances it may be preferable to perform the machining step on the rivets after they have been heated and quenched to harden them. The machining step may be performed before or after tempering of the rivets. An advantage of doing this is that the material of the rivets will exhibit more consistent mechanical properties, and thus machining of the rivets will provide more consistent results (i.e. rivets with more consistent tip shapes). A further advantage of the more consistent mechanical properties of the rivet material is that wear of the machining tool can be more accurately predicted. Tempering may be used to produce rivet batches at a range of hardness levels, for example from approximately 280 Hv to 580 Hv).

Figure 10A:
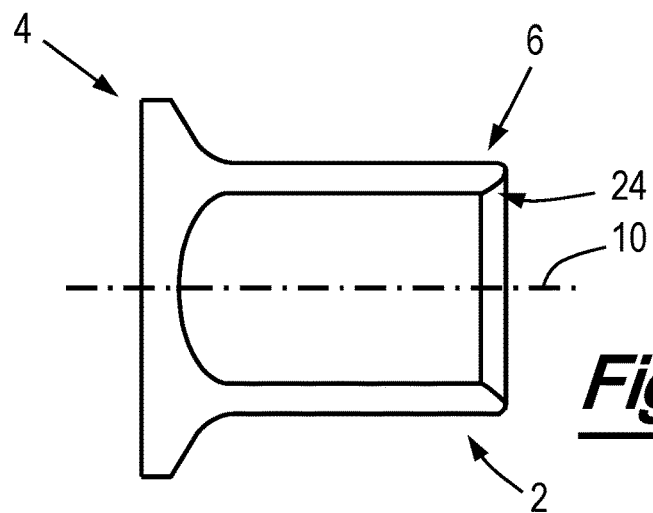
FIGS. 10A to 10O are schematic cross-sectional side views of stages in a method according to a second embodiment of the invention.
Figure 10B:
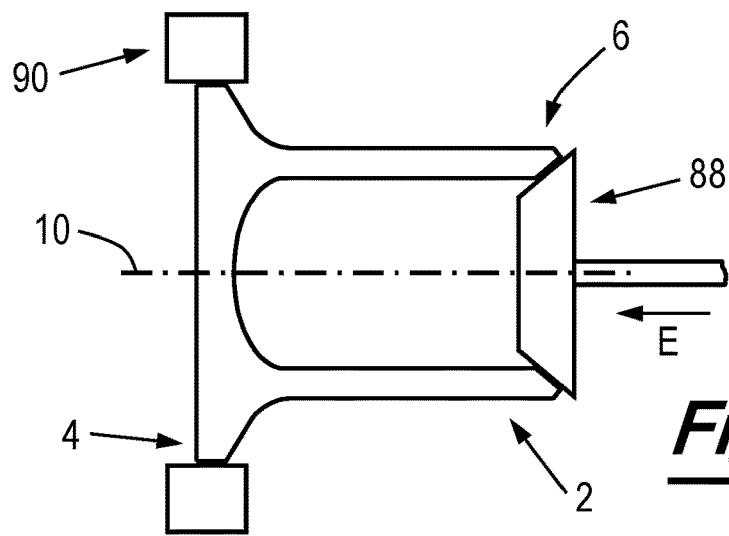
Figure 10C:
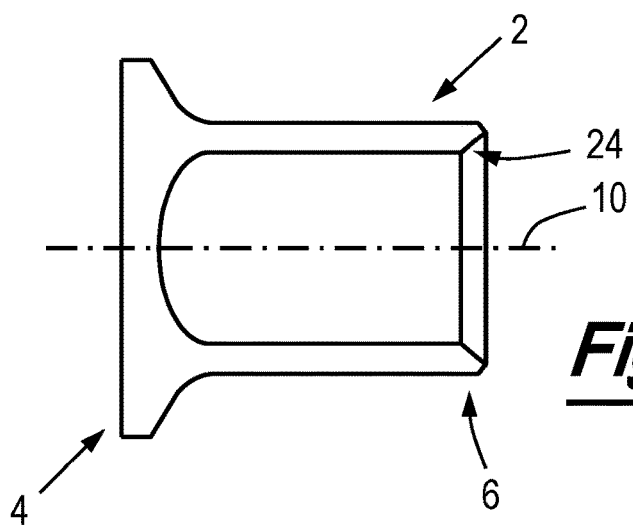

A method according to a second embodiment to the invention is illustrated in FIGS. 10A to 10C. As with the first embodiment, the second embodiment involves manufacturing a rivet using a conventional method such as that described with reference to FIGS. 5A to 5F, before performing a machining operation on the tip of the rivet so as to give the rivet its final geometry. Again, therefore, the rivet produced by the forging process may be longer than the desired final length, so that material can be removed from the tip without making the rivet too short. Another exemplary rivet produced by a known process such as that described above is shown in FIG. 10A. In this case, the rivet 2 has an uneven tip 6 in that its inner portion 44 is arcuate in cross section, with the radius of curvature being different at different points about the circumference of the rivet. In this embodiment, performing the machining operation comprises grinding the inner portion 44 of the tip 6 using a grinding tool 88.

The grinding tool used in this embodiment is a grinding plug (sometimes called a grinding cone), however in other embodiments different types or shapes of grinding tool may be used. The grinding plug 88 of this embodiment may be considered a formed tool in that the tool is provided with geometry which imparts the required geometry to the tip 6 of the rivet, rather than the geometry being selected merely by changing the orientation of the tool 88. In this case, for example, it is desired for the inner portion 24 of the rivet 2 to be frusto-conical and positioned at around 45° to the longitudinal axis 10 of the rivet 2. The grinding plug therefore has a surface which is frusto-conical and is positioned at around 45° to its own longitudinal axis (not shown), and grinding takes place with this longitudinal axis substantially aligned with the longitudinal axis 10 of the rivet.

To perform the machining operation of the second embodiment, the head 4 of the rivet 2 is held stationary in a clamp 90. The grinding plug 88 is then rotated about the longitudinal axis 10 of the rivet (this is an example of moving the tool 88 relative to the rivet in a speed direction), and is moved towards the rivet in a feed direction E. As with the first embodiment, in the second embodiment the feed direction E is substantially parallel to the longitudinal axis 10 of the rivet 2. In the second embodiment, as with the first, once the machining process has been completed, the tip 6 is completely uniform in shape. Again, however, in other embodiments the machining operation may merely reduce the lack of uniformity of the tip rather than eliminating it altogether. As with the first embodiment, the grinding plug 88 removes material which may include defects that could otherwise cause a failure in a joint produced using the rivet 2.

Figure 11A:
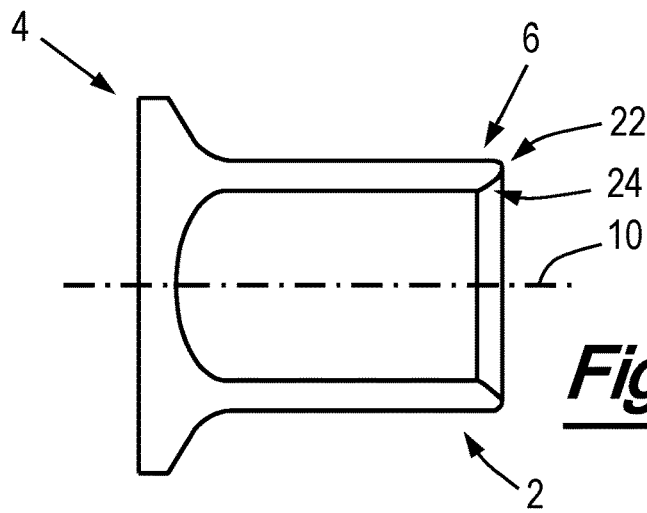
FIGS. 11A to 11O are schematic cross-sectional side views of stages in a method according to a third embodiment of the invention.
Figure 11B:
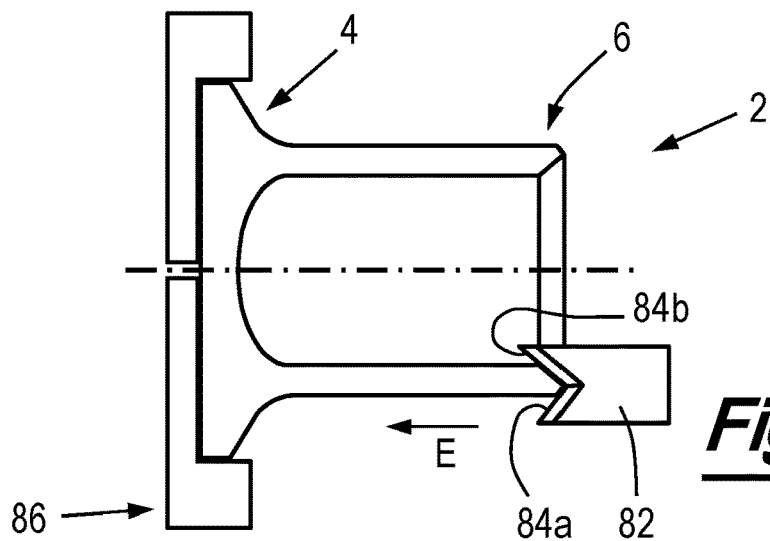
Figure 11C:
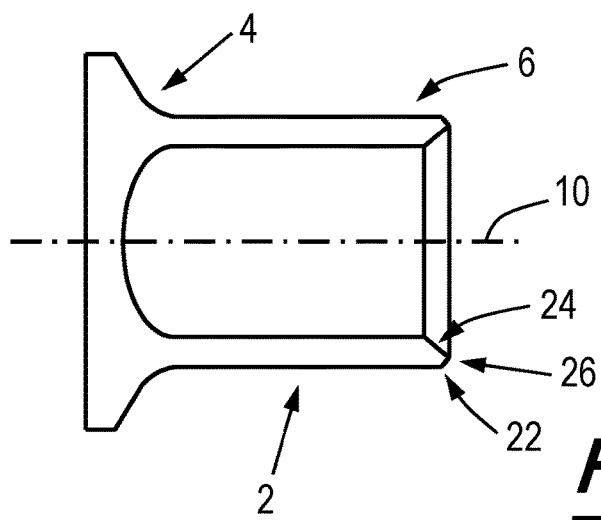

A method according to a third embodiment of the invention is illustrated in FIGS. 11A to 11C. The method of the third embodiment is similar to the method of the first embodiment, with the exception that the bladed tool 82 of the third embodiment is a formed tool. The tool 82 has two cutting edges 84a, 84b of the required shape (in this case straight) and at the required angle relative to one another so that feeding the tool in the feed direction E produces the desired geometry at the rivet tip 6. The third embodiment also differs from the first embodiment in that the machining operation is performed on substantially the entire tip 6 (i.e. in this case the inner portion 24, the outer portion 22 and the cutting edge 26 defined therebetween).

It will be appreciated that although in this case the formed bladed tool 82 has a single blade with two cutting edges 84a, 84b, in other embodiments a formed bladed tool may have a single cutting edge which follows the shape required of the tip of a rivet (or the portion to be machined, if this is not the entire tip). As another alternative, the tool may have two or more discrete blades which overlie one another so as to cooperatively provide the required shape.

The depth to which the machining is performed in embodiments of the invention may be varied according to properties of rivets which are being machined. The term "depth of machining" may be interpreted as meaning the depth of rivet material in the longitudinal axis 10 direction which is removed from the rivet 2.

In embodiments in which the machining is performed in order to improve the uniformity of the shape of the rivet tip 6, the depth of machining which is used will generally be greater than the depth of the non-uniformity of the rivet tip prior to machining. The depth of the non-uniformity may be measured in advance, for example using one or more sample rivets taken from a batch of rivets. The depth of the non-uniformity may for example be determined using microscopy or any suitable tooling/gauging system (e.g. a probe-based length gauging system) in a known manner.

In an embodiment, the depth of machining performed to improve the uniformity of the shape of the rivet tip 6 may for example be at least 0.6 mm. Rivet tip shape non-uniformity will generally be smaller than this, and thus machining to a depth of at least 0.6 mm will be sufficient to remove any such non-uniformity. If rivet tip shape non-uniformity measured for sample rivets is consistently significantly smaller than for example 0.5 mm then the depth of machining may be reduced accordingly. For example the depth of machining may be set to be at least 0.5 mm. In general, the depth of machining should remain greater than the depth of rivet tip shape non-uniformities seen in sample rivets (e.g. the depth of machining may be at least 0.1 mm greater than the depth of rivet tip shape non-uniformities seen in sample rivets). For example, the depth of machining may be set to be at least 0.3 mm if the rivet tip shape non-uniformity is consistently around 0.2 mm or less than this. The depth of machining may be 1 mm or more, and may for example be 5 mm or more. This may apply for example for rivets with a diameter larger than a conventional diameter such as a diameter greater than 5.5 mm, since such larger diameter rivets have larger tips.

In general, it is advantageous to machine rivets to a depth which is enough to remove tip shape non-uniformities without machining significantly beyond that depth. This is because machining to depth greater than is necessary will increase time required to make the rivets (and therefore also increase the cost), and will increase wear of the tool which is performing the machining.

As noted further above the depth of defects in rivets may generally be less than 100 microns, and in some instances may be in excess of 100 microns (but generally significantly less than 200 microns). Consequently, machining a rivet tip to a depth of 200 microns (0.2 mm) will remove the vast majority of defects from the rivet tip and will probably remove all defects from a rivet tip. Although unlikely, it is possible that a very small number of defects will have a depth greater than 200 microns, and machining to a depth of 200 microns would not fully remove those defects. Machining to a greater depth, for example 500 microns (0.5 mm) can be expected to remove all defects from the rivet tip. As will be appreciated, if the rivet tip is being machined to improve the uniformity of the tip shape then this machining will at the same time remove defects from the rivet tip. Machining to a depth of at least 0.6 mm to provide a uniform rivet tip shape (as described above) can be expected to remove all defects from the rivet tip. Machining to a depth of at least 0.3 mm can be expected to remove all defects from the rivet tip.

The depth of defects may vary between batches of rivets, e.g. for different types of the material used to make the rivets, or due to variation of the condition of the tooling used to produce slugs that were formed into the rivets. Therefore, one or more samples from a batch of rivets may be examined to determine whether such defects are present in the rivets, and the depth of defects present. The depth of machining to be applied to the rivet tip may be selected accordingly in order to remove the defects.

In an embodiment, machining may remove a majority of defects but not all defects. Some defects may be reduced in length but partially remain. These defects may be reduced in length by at least half. In such an embodiment, although some defects partially remain in the rivet the size of those defects may be sufficiently small that the rivet will behave in a desired manner when inserted into a workpiece (and provide a joint with a desired strength).

In an embodiment, machining may be used to apply a desired shape to a rivet tip, and not merely to improve the uniformity of rivet tip geometry which is already present. In other words, a rivet is formed without a desired tip shape and then machining is used to apply the desired rivet tip shape. Where this approach is used the depth of machining used will be greater than the depth of the desired rivet tip shape. The depth of machining may for example be 2 mm or more, and may be 3 mm or more. This will allow a rivet to be provided with a frusto-conical inner portion 24 with having depth of 2 mm or more, or 3 mm or more. The depth of machining may be 5 mm or more (e.g. for rivets with a diameter larger than a conventional diameter such as a diameter greater than 5.5 mm). The depth of machining may for example be at least 0.5 mm.

Machining may be used to provide the rivet with a shape which is difficult or impossible to achieve using a conventional method (e.g. the method described above in connection with FIG. 5). In an embodiment, machining may extend along all or substantially all of the bore of the rivet. For example, the bore of the rivet may be tapered along the length of the bore. The taper may narrow towards the head of the rivet or may narrow towards the tip of the rivet. In an embodiment the bore may have narrowed waist portion and may taper outwards on either side of that portion (i.e. taper outwards towards the head and taper outwards towards the tip). In an embodiment the rivet may initially be provided with a bore which is generally parallel to the axial direction, and the bore may then be shaped in a desired manner using machining (e.g. to provide the bore with a taper and/or a waist). The bore may be a blind bore or may be a through-bore.

In general, a shape applied using machining may extend partway along the axial length of a rivet or may extend up to the web of the rivet. The depth of machining may for example correspond with the length of the rivet (e.g. for a through-bore which is machined along its entire length). The depth of machining may for example be up to 5 mm (e.g. for a 5 mm long rivet), or may be up to 14 mm (e.g. for a 14 mm long rivet. The depth of machining may be greater than 14 mm.

Figure 12A:
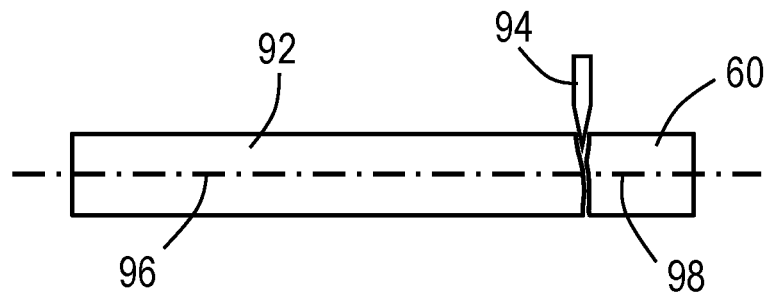
FIGS. 12A to 12C are schematic cross-sectional side views of stages in a method according to a fourth embodiment of the invention.
Figure 12B:
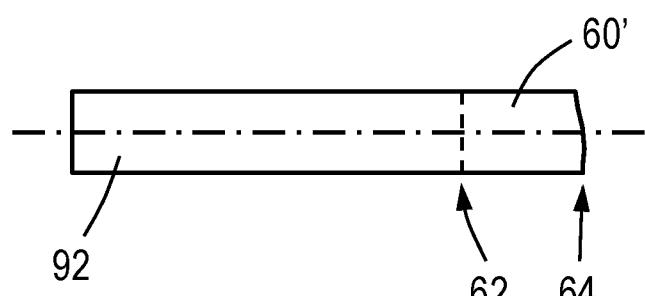
Figure 12C:
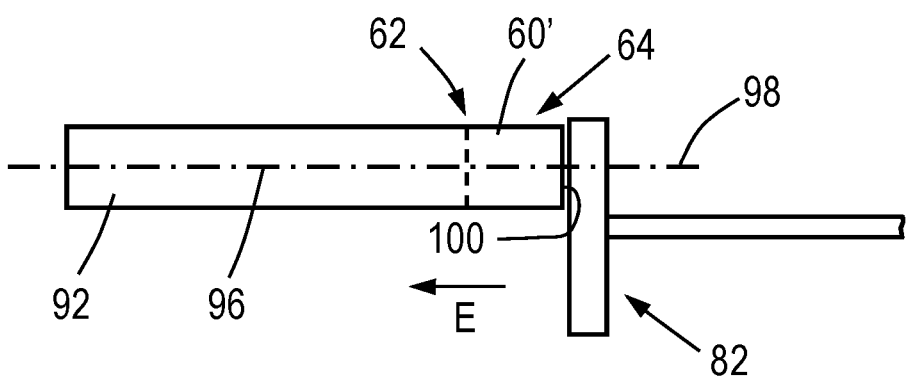

FIGS. 12A to 12C illustrate a fourth embodiment of the invention. Whilst in the above embodiment of the invention the machining operations are performed on the rivets, in this embodiment the machining operations are instead performed on the slugs, and those slugs are then forged into rivets in conventional fashion. More particularly, in this embodiment the machining operation is performed on each slug while that slug is still part of the length of wire from which the slugs are made (the wire may be considered to be an array of slugs joined together end-to-end).

Referring first to FIG. 12A, in this embodiment slugs 60 are separated from a length of wire 92 in the same manner as the conventional method described with reference to FIGS. 5A to 5F. To separate a slug 60 from the length of wire 92, a shearing blade 94 is driven into the length of wire 92, making an indentation in the wire 92 before causing the wire to fracture (producing to a first region where the shearing blade penetrated into wire by displacing the material of the wire, and a second portion in the form of a fracture surface, as discussed in relation to FIG. 5A). It is noteworthy that in this embodiment, the wire 92 defines a longitudinal axis 96, and each slug 6 separated from the wire defines a longitudinal axis 98 which is substantially aligned with the portion of the longitudinal axis 96 of the wire which ran therethrough. It should also be noted that in this case after each slug has been forged into a rivet, the longitudinal axis of the rivet is substantially aligned with the longitudinal axis 98 of the slug 60 from which it was made. The longitudinal axis of a rivet being substantially aligned with the longitudinal axis of the slug from which it was made also applies in relation to the exemplary method described above, as will be apparent from FIGS. 5A to 5F.

Referring now to FIG. 12B, it can be seen that the end of the wire from which a slug has been separated is slightly rough and uneven, as has been described above. In this embodiment, the machining operation is performed at this stage, on the tail end 64 of the slug 60' that is next to be removed from the length of wire 92. This is shown in FIG. 12C. So that material can be removed from the slug 60 by the machining process but still leave sufficient length for the forging process to form a rivet of the required length, the slugs are fractured from the wire 92 such that they are slightly longer than is required.

In this embodiment, the machining operation mills down the tail end 64 of the slug 60' using a bladed tool 82 in the form of a milling tool. The milling tool is rotated (another example of movement in a speed direction) and introduced to the slug 60' in a feed direction E which in this embodiment is substantially parallel to the longitudinal axis 96 of the wire 92 (and thus is parallel to the longitudinal axis 98 of the slug 60' as well). The tool 82 produces a substantially planar surface 100 on the tail end 64 of the slug 60'. In this case the surface 100 is substantially perpendicular to the longitudinal axis 98 of the slug 60'. Accordingly, when the slug 60' is forged into a rivet there will not be an oblique surface the tail end 64 of the slug which could lead to the tip of the rivet being uneven after forging. Further, the machining operation removing material from the tail end 64 of the slug 60' means that defects produced during separation of the previous slug (60 in FIG. 12A) from the wire 92 can be removed.

Figure 13:
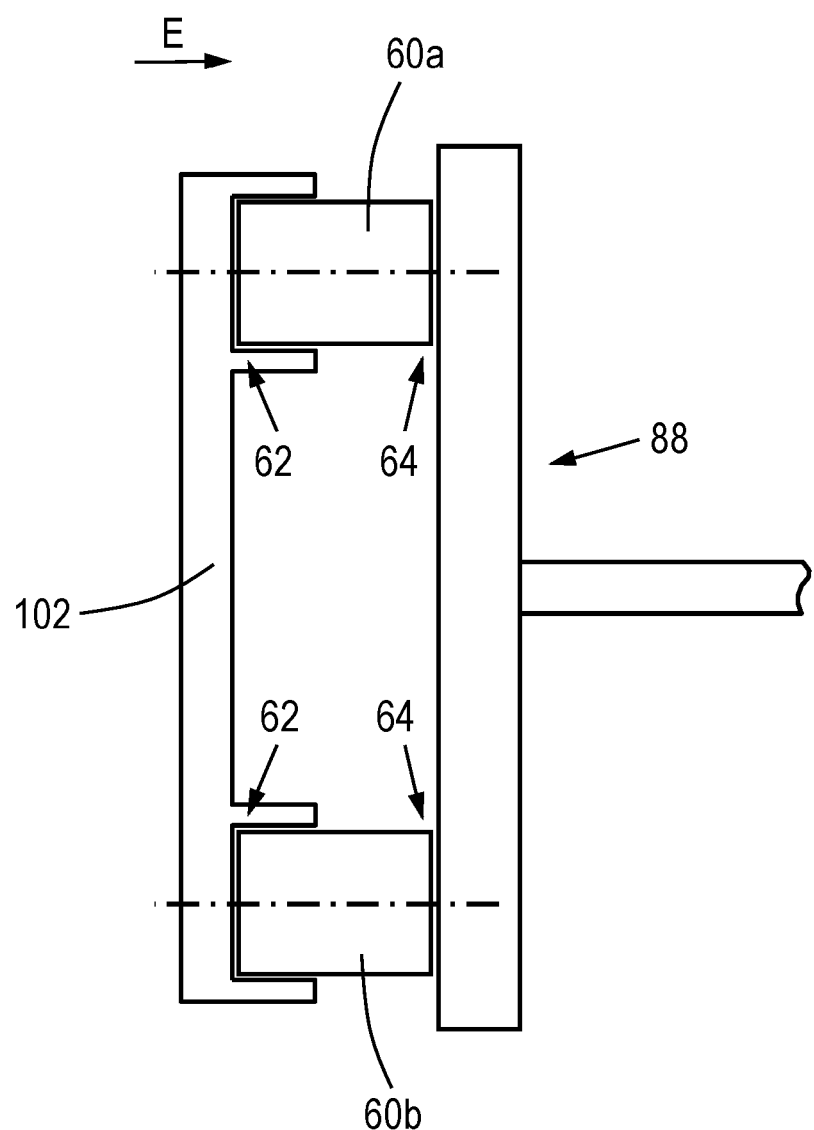
FIG. 13 is a schematic cross-sectional side view of a stage in a method according to a fifth embodiment of the invention.

A fifth embodiment of the invention is illustrated in FIG. 13. In the fifth embodiment, like the fourth embodiment, the machining operations are performed on the slugs 60 rather than the completed rivets. In this case, however, the slugs are machined once they have been separated from a length of wire (for instance using a shearing blade as discussed above), rather than while they are still part of the wire as was the case with the fourth embodiment.

In the fifth embodiment, each machining operation is performed on two slugs 60a, 60b at the same time. More particularly, two slugs 60a, 60b are held in a jig 102 with their respective tail ends 64 towards a grinding tool 88 (in this case a rotating grinding wheel). The jig 102 is then advanced in a feed direction E towards the grinding wheel 88. In this case, therefore, it is the slugs that move relative to the tool in the feed direction, rather than vice versa.

In a modification of the fifth embodiment, both the tail ends 64 and the head ends 62 of the slugs 60a, 60b are machined. For instance, after machining one end of each slug 60a, 60b, their orientation in the jig 102 may be reversed so that the other end can be machined. As an alternative, the jig 102 may be adapted so that each slug 60a, 60b is held in the middle with both ends exposed for machining (for instance simultaneous machining using two tools).

Figure 14:
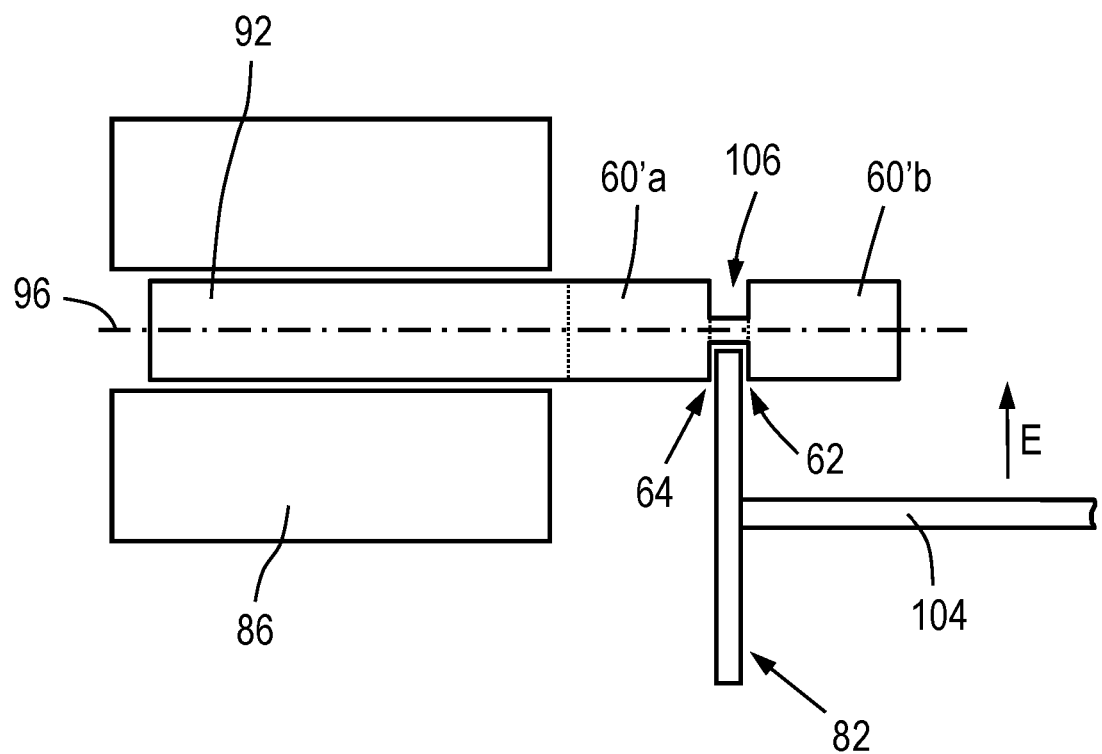
FIG. 14 is a schematic cross-sectional side view of a stage in a method according to a sixth embodiment of the invention.

FIG. 14 illustrates a sixth embodiment of the invention. Like the fourth embodiment, in this embodiment the machining operations are performed on slugs 60'a, 60'b while they are still part of the length of wire 92. In this case, however, each machining operation also separates a slug from the wire. In this embodiment the machining operations are performed using a simple-geometry bladed tool 82 in the form of a parting saw (a type of circular saw) which is rotated by a spindle 104 about an axis which is parallel to the longitudinal axis 96 of the length of wire 92 (and thus parallel to the longitudinal axis of the slugs 60'a, 60'b). The parting saw 82 is then moved in a feed direction E, which in this case is perpendicular to the longitudinal axis 96 of the wire 92 (and thus of the slugs 60'a, 60'b), towards the longitudinal axis of the wire so as to cut into the material of the wire 92.

In this particular embodiment, the length of wire 92 is rotated about its longitudinal axis 96 by a chuck 86 as the parting saw 82 cuts into the wire. Accordingly, as the saw 82 is moved in the feed direction E it produces a gradually deepening annular groove 106 around the longitudinal axis of the wire (and thus of the slugs 60'a, 60'b). The sides of the groove 106 form a surface at the tail end 64 of one slug 60'a, and a surface at the head end 62 of the adjacent slug 60'b. Once the depth of the groove 106 is equal to the radius of the wire 92 (i.e. once the groove reaches the longitudinal axis 96 of the wire), the machining of the tail end 64 of one slug 60'a and the head end 62 of the other slug 60'b is complete, and one of the slugs 60'b has been separated from the length of wire 92. In this particular embodiment, the machining operation produces surfaces (not labelled) on the tail end 64 of one slug 60'a and the head end 62 of the other slug 60'b, both surfaces being substantially perpendicular to the longitudinal axis 96 of the wire 92 (and thus substantially perpendicular to the longitudinal axes of the respective slugs 60'a, 60'b).

Rotating the length of wire 92 about its longitudinal axis 96 while it is being cut can improve the circumferential uniformity of the tail ends 64 of the slugs 60'a, 60'b, thereby potentially reducing the chances of the rivets forged from those slugs having irregular tips. If the length of wire 92 were not rotated, then if the wire and/or the spindle 104 of the saw deflected during cutting, this would change the angle of the cut relative to the longitudinal axis of the wire. This, in turn, may lead to an oblique surface being produced at the tail end 64 of the slug 60'a. In contrast, rotating the length of wire 92 about its longitudinal axis 96 during cutting means that any deflection of the wire 92 or spindle 104 would appear uniformly about the circumference of the wire. For instance, deflection of the wire 92 away from the saw 82 may create a slightly convex surface at the tail end 64 of the slug 60'a. Similarly, deflection of the spindle 104 away from the wire 92 may create a slightly concave surface at the tail end 64 of the slug 60'a. A convex or concave surface may not usually be desired, but may be preferable over an oblique surface due to there being a reduced chance of that surface leading to irregularity around the tip of a finished rivet.

Another advantage of rotating the length of wire 92 about its longitudinal axis 96 while cutting it is that when the slug 60'b detaches, any swarf left behind forms a pip or indentation in the centre of the slug, where it would be unlikely to effect the tip geometry of the finished rivet. In contrast, if the wire was simply cut from one side to the other, when the slug 60'b detached any residual swarf would remain on the periphery of the slug, where it may lead to the tip of the finished rivet being irregular about its circumference.

Similar advantages may be achieved in other embodiments (whether these perform the machining operations on slugs or on rivets) by rotating the slug/rivet about its longitudinal axis relative to the tool, or similarly by rotating the tool relative to the slug/rivet about the longitudinal axis of that slug/rivet.

The above embodiment has been described in relation to each machining operation being performed on the tail end 64 of one slug 60'a but also separating an adjacent slug 60'b (i.e. the preceding slug to the slug whose tail end the machining operation was performed upon). However, since the ends of the slugs 60'a, 60'b are substantially identical, it may also be considered that the machining operation performed on the tail end of each slug also separates that slug from the wire, depending on how the rivets are oriented when forged into rivets. For instance, referring to FIG. 14 it may be considered that the tail ends of the slugs in fact face to the left from the perspective of the figure. In that case, the machining operation shown in FIG. 14 would be machining the tail end of the slug labelled 60'b and also separating that slug from the length of wire 92, while additionally machining the head end of the slug labelled 60'a.

For completeness, in the above embodiment it may equally be considered that the slugs in the wire are arranged in different orientations, rather than all having their heads facing the same direction. For instance, the slugs may be considered to be arranged head-to-head and tail-to-tail. Nonetheless, in the embodiment each slug would have a machining operation performed on its tail end and each machining operation would separate a slug from the wire, whether or not any particular slug is separated from the wire by the same machining operation that is performed on its tip.

In embodiments of the invention in which machining is applied to a slug before that slug has been formed into a rivet, the depth of machining to be applied may be selected using considerations similar to those described further above in connection with machining of a rivet tip. Thus, for example, if machining is performed to remove an asymmetry from the end of a slug then that machining may be to a depth which is greater than the depth of the asymmetry (e.g. machining to a depth of around 0.6 mm or more). If machining is performed primarily to remove defects from the end of the slug, e.g. if the end of the slug does not include a significant asymmetry, then the depth of machining may be less (e.g. around 0.2 mm or more, e.g. around 0.5 mm or more).

Although methods where machining operations are performed on the slugs have been described separately from methods where machining operations are performed on the rivets, it is to be understood that in some embodiments machining operations may be performed both on the slugs and all the rivets. For example, in some embodiments the slugs may undergo a machining operation, and the rivets produced from those slugs may subsequently undergo a further machining operation (at which point either of said operations may be considered to be the machining operation required in the present invention, therefore that embodiment could be considered to be both an embodiment where the machining operations are performed on the slugs, and an embodiment where the machining operations are performed on the rivets).

Although in the embodiments described above the forging process has been described as being of conventional fashion, this should not be construed as limiting. The forging of slugs into rivets may take any suitable form. In some embodiments where the machining operations are performed on the slugs, the machining operation may replace some of the forging process (for instance the slugs may be machined to the point shown in FIG. 5C before the forging process begins).

The shape of a rivet tip may be measured using any suitable method. For example, confocal white light microscopy may be used together with software to generate a 3D image of a rivet tip. Alternatively, laser profile scanning may be used together with software to generate a 3D picture of a rivet tip. Measurement of the rivet tip shape may be performed on one or more sample rivets. The measurement may be performed before rivets are machined, for example to determine the depth of non-uniformity of the rivet tip shape. Additionally or alternatively the measurement may be performed after machining in order to confirm that non-uniformity of the rivet tip shape has been removed.

Any suitable method may be used to look for defects in rivets. For example, optical microscopy of a rivet may be used. This may be a destructive method, e.g. with the rivet being sliced into sections before inspection in order to allow the inside of the rivet to be seen. In an alternative method the performance of a rivet may be determined by pressing the rivet into a die and looking for cracks in the rivet tip. This may be done without any workpiece material being present, or may be done with workpiece material being present.

In relation to performing the machining operations, reference herein to the longitudinal axis of one of a rivet, slug or length of wire may equally be considered to refer to another of the rivet, slug or length of wire, where appropriate.

Optional and/or preferred features as set out herein may be used either individually or in combination with each other where appropriate and particularly (though not exclusively) in the combinations as set out in the accompanying claims. The optional and/or preferred features for each aspect of the invention are also applicable to any other aspects of the invention where appropriate.

The invention claimed is:

1. A method of manufacturing self-pierce rivets from a length of wire, the method comprising:
  separating the length of wire to form a plurality of slugs, each slug defining a head end and a tail end; and
  forging a plurality of rivets from the slugs, each rivet having a head formed from the head end of a slug and a tip formed from the tail end of that slug, the head and the tip of the rivet being separated by a shank which defines a longitudinal axis, the rivet having a bore which runs substantially longitudinally through the tip and at least part way along the shank;
  wherein, for each of the plurality of rivets, the method comprises performing a machining operation to remove material from at least one selected from the group of an outer portion and an inner portion of the tip of the rivet, or from the tail end of the slug from which the rivet was forged.

2. A method according to claim 1, wherein the machining operations are performed on the slugs, and each machining operation also separates a slug from the length of wire.

3. A method according to claim 1, wherein the machining operation is performed on each slug once that slug has been separated from the length of wire.

4. A method according to claim 1, wherein the machining operations are performed on the rivets.

5. A method according to claim 4, wherein the machining operation performed on each rivet forms at least the part of the tip which is adjacent an outer periphery of the shank.

6. A method according to claim 4, wherein the machining operation performed on each rivet forms at least the part of the tip which is adjacent to the bore.

7. A method according to claim 6, wherein the machining operation performed on each rivet forms at least the part of the tip which is adjacent an outer periphery of the shank; and
  wherein the machining operation performed on each rivet forms the entire tip.

8. A method according to claim 4, wherein the machining operation removes material along substantially all of the length of the bore of the rivet.

9. A method according to claim 4, wherein the machining operation removes material along the entire length of the rivet.

10. A method according to claim 1, wherein the machining operation is performed using a saw.

11. A method according to claim 1, wherein the machining operation is performed using a grinding tool.

12. A method according to claim 1, wherein the machining operation is performed using a bladed tool.

13. A method according to claim 11, wherein said tool is a formed tool.

14. A method according to claim 11, wherein said tool is a simple-geometry tool.

15. A method according to claim 1, wherein:
  before separation of the length of wire to form the slugs, the length of wire defines a longitudinal axis;
  after each slug is separated from the length of wire, that slug defines a longitudinal axis which is substantially aligned with the portion of the longitudinal axis of the wire which ran therethrough; and
  after each rivet is forged from a slug, the longitudinal axis of the rivet is substantially aligned with the longitudinal axis of the slug from which it was made.

16. A method according to claim 15, wherein the machining operations are performed on the slugs, and each machining operation also separates a slug from the length of wire, wherein the machining operation forms a substantially planar surface on the tail end of the slug, that surface being positioned substantially perpendicular to the longitudinal axis of the slug.

17. A method according to claim 15, wherein the machining operations are performed on each slug once that slug has been separated from the length of wire, wherein the machining operation forms a substantially planar surface on the tail end of the slug, that surface being positioned substantially perpendicular to the longitudinal axis of the slug.

18. A method according to claim 15, wherein each machining operation is performed while the slug or rivet, and the tool used to perform the machining operation, are rotated relative to one another about the longitudinal axis of the slug or rivet.

19. A method according to claim 1, wherein the machining operation removes material to a depth of at least 0.2 mm.

20. A method according to claim 1, wherein the machining operation removes material from an axially outermost tip of the rivet.

21. A rivet manufactured using a method of manufacturing self-pierce rivets from a length of wire, the method comprising:
  separating the length of wire to form a plurality of slugs, each slug defining a head end and a tail end; and
  forging a plurality of rivets from the slugs, each rivet having a head formed from the head end of a slug and a tip formed from the tail end of that slug, the head and the tip of the rivet being separated by a shank which defines a longitudinal axis, the rivet having a bore which runs substantially longitudinally through the tip and at least part way along the shank;
  wherein, for each of the plurality of rivets, the method comprises performing a machining operation to remove material from at least one selected from the group of an outer portion and an inner portion of the tip of the rivet, or from the tail end of the slug from which the rivet was forged.

22. A method of manufacturing a product, the method comprising manufacturing self-pierce rivets from a length of wire, and driving one of the rivets into a workpiece using a punch such that the rivet flares into the workpiece without fully penetrating the workpiece;
  wherein manufacturing self-pierce rivets from a length of wire comprises:
    separating the length of wire to form a plurality of slugs, each slug defining a head end and a tail end; and
    forging a plurality of rivets from the slugs, each rivet having a head formed from the head end of a slug and a tip formed from the tail end of that slug, the head and the tip of the rivet being separated by a shank which defines a longitudinal axis, the rivet having a bore which runs substantially longitudinally through the tip and at least part way along the shank;
  wherein, for each of the plurality of rivets, the method comprises performing a machining operation to remove material from at least one selected from the group of an outer portion and an inner portion of the tip of the rivet, or from the tail end of the slug from which the rivet was forged.

23. A product manufactured using a method of manufacturing a product, the method comprising manufacturing self-pierce rivets from a length of wire, and driving one of the rivets into a workpiece using a punch such that the rivet flares into the workpiece without fully penetrating the workpiece;
  wherein manufacturing self-pierce rivets from a length of wire comprises:
    separating the length of wire to form a plurality of slugs, each slug defining a head end and a tail end; and
    forging a plurality of rivets from the slugs, each rivet having a head formed from the head end of a slug and a tip formed from the tail end of that slug, the head and the tip of the rivet being separated by a shank which defines a longitudinal axis, the rivet having a bore which runs substantially longitudinally through the tip and at least part way along the shank;
  wherein, for each of the plurality of rivets, the method comprises performing a machining operation to remove material from at least one selected from the group of an outer portion and an inner portion of the tip of the rivet, or from the tail end of the slug from which the rivet was forged.

24. A product according to claim 23, wherein the product is a vehicle.

* * * * *